(12) United States Patent
Yashiro

(10) Patent No.: US 12,210,240 B2
(45) Date of Patent: Jan. 28, 2025

(54) ELECTRO-OPTICAL APPARATUS AND ELECTRONIC APPARATUS

(71) Applicant: SEIKO EPSON CORPORATION, Tokyo (JP)

(72) Inventor: Yuki Yashiro, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/673,690

(22) Filed: May 24, 2024

(65) Prior Publication Data

US 2024/0393636 A1 Nov. 28, 2024

(30) Foreign Application Priority Data

May 25, 2023 (JP) .................................. 2023-086215

(51) Int. Cl.
*G02F 1/1335* (2006.01)
*G02F 1/1333* (2006.01)
*G02F 1/1343* (2006.01)
*G02F 1/1345* (2006.01)
*G02F 1/1368* (2006.01)

(52) U.S. Cl.
CPC .. *G02F 1/133526* (2013.01); *G02F 1/134309* (2013.01); *G02F 1/13439* (2013.01); *G02F 1/1368* (2013.01); *G02F 1/133345* (2013.01); *G02F 1/13458* (2013.01)

(58) Field of Classification Search
CPC ............. G02F 1/1333; G02F 1/133345; G02F 1/133357; G02F 1/1335; G02F 1/133526; G02F 1/1343; G02F 1/134309; G02F 1/13439; G02F 1/1345; G02F 1/13452; G02F 1/13458; G02F 1/1362; G02F 1/136213; G02F 1/136227; G02F 1/1368
See application file for complete search history.

(56) References Cited

U.S. PATENT DOCUMENTS 10,942,388 B1 * 3/2021 Haruyama ........ G02F 1/133512

FOREIGN PATENT DOCUMENTS

JP 2021-167884 A 10/2021

* cited by examiner

*Primary Examiner* — Thoi V Duong
(74) *Attorney, Agent, or Firm* — Oliff PLC

(57) ABSTRACT

An electro-optical apparatus includes a pixel electrode, a peripheral electrode, a transistor between the pixel electrode and a base, a relay layer between the pixel electrode and the transistor, a relay layer between the peripheral electrode and the base, a lens forming layer provided between the pixel electrode and the relay layer and including a lens surface and a contact hole, a lens forming layer provided between the peripheral electrode and the relay layer and including a lens surface and a contact hole, a contact plug provided in the contact hole and electrically coupling the pixel electrode and the relay layer, and a contact plug provided in the contact hole and electrically coupling the peripheral electrode and the relay layer.

18 Claims, 18 Drawing Sheets

ELECTRO-OPTICAL APPARATUS AND ELECTRONIC APPARATUS

The present application is based on, and claims priority from JP Application Serial Number 2023-086215, filed May 25, 2023, the disclosure of which is hereby incorporated by reference herein in its entirety.

BACKGROUND

1. Technical Field

The present disclosure relates to an electro-optical apparatus and electronic apparatus including the electro-optical apparatus.

2. Related Art

An electro-optical apparatus described in JP 2021-167884 A is known as an example of existing electro-optical apparatuses. JP 2021-167884 A describes an electro-optical apparatus including a pixel electrode provided above a substrate body of an element substrate, a transistor provided between the pixel electrode and the substrate body, a lens provided between the pixel electrode and the transistor, and a coupling member that is provided so as to extend through a layer provided with the lens and electrically couples the pixel electrode and the transistor.

Since the layer provided with the lens between the pixel electrode and the transistor is thick, it is necessary to form a contact hole having a high aspect ratio at the layer provided with the lens in order to provide the coupling member extending through the layer provided with the lens.

However, a step of forming the contact hole with a high aspect ratio requires a long time for etching, and thus has a problem of high difficulty in processing.

SUMMARY

An electro-optical apparatus according to an aspect of the present disclosure includes a first substrate, a second substrate facing the first substrate, and an electro-optical layer provided between the first substrate and the second substrate, wherein the first substrate includes a pixel electrode provided in a display region, a peripheral electrode provided in a peripheral region, a transistor provided between the pixel electrode and the first substrate, a first relay electrode provided between the pixel electrode and the transistor, a second relay electrode provided between the peripheral electrode and the first substrate, and being in the same layer as the first relay electrode, a first lens forming layer provided between the pixel electrode and the first relay electrode, and including a first lens and a first contact hole, a second lens forming layer provided between the peripheral electrode and the second relay electrode, including a second lens and a second contact hole, and being in the same layer as the first lens forming layer, a first conductive member provided in the first contact hole, and electrically coupling the pixel electrode and the first relay electrode, and a second conductive member provided in the second contact hole, and electrically coupling the peripheral electrode and the second relay electrode.

An electro-optical apparatus according to an aspect of the present application includes a first substrate, a second substrate facing the first substrate, and an electro-optical layer provided between the first substrate and the second substrate, wherein the first substrate includes a pixel electrode provided in a display region, a peripheral electrode provided in a peripheral region, a transistor provided between the pixel electrode and the first substrate, a first relay electrode provided between the pixel electrode and the transistor, a second relay electrode provided between the peripheral electrode and the first substrate, and being in the same layer as the first relay electrode, a third relay electrode provided between the pixel electrode and the first relay electrode, a fourth relay electrode provided between the peripheral electrode and the second relay electrode, and being in the same layer as the third relay electrode, a first lens forming layer provided between the third relay electrode and the first relay electrode, and including a first lens and a first contact hole, a second lens forming layer provided between the fourth relay electrode and the second relay electrode, including a second lens and a second contact hole, and being in the same layer as the first lens forming layer, a first conductive member provided in the first contact hole, and electrically coupling the pixel electrode and the first relay electrode, and a second conductive member provided in the second contact hole, and electrically coupling the peripheral electrode and the second relay electrode.

Electronic apparatus according to an aspect of the present application includes the above-described electro-optical apparatus.

DESCRIPTION OF EMBODIMENTS

Embodiments of the present disclosure are described below with reference to the accompanying drawings.

Note that, in the following drawings, the dimensions of some components may be scaled differently for ease of understanding for the components.

In addition, in the following description, an X-axis, a Y-axis, and a Z-axis orthogonal to each other are used as necessary for convenience of description. Further, one direction along the X-axis is denoted as an X1 direction, and a direction opposite to the X1 direction is denoted as an X2 direction. Likewise, one direction along the Y-axis is denoted as a Y1 direction, and a direction opposite to the Y1 direction is denoted as a Y2 direction. One direction along the Z-axis is denoted as a Z1 direction, and a direction opposite to the Z1 direction is denoted as a Z2 direction. In addition, in the following description, a view in the Z1 direction or the Z2 direction is referred to as "plan view", and a view in a direction perpendicular to a cross-section including the Z-axis is referred to as "cross-sectional view".

Further, in the following description, regarding a substrate, "above a substrate" means any of a case where an element is disposed above the substrate in contact with the substrate, a case where an element is disposed above the substrate with another structure therebetween, and a case where one part of an element is disposed above the substrate in contact with the substrate while another part is disposed above the substrate with another structure therebetween, for example. In addition, a description of "an upper surface of a substrate" indicates a surface of the substrate on the Z1 direction side.

1. Embodiment 1

In the embodiment, an example of a liquid crystal apparatus, as an electro-optical apparatus, will be described.

The liquid crystal apparatus is an active drive type transmission type liquid crystal apparatus including a thin film transistor (TFT) as a switching element for each pixel. This liquid crystal apparatus is used as a light modulation apparatus in a projection-type display device described later, for example. Note that, in the embodiment, the projection type display device is an example of an electronic apparatus.

1.1. Overview of Structure of Liquid Crystal Apparatus

Figure 1:
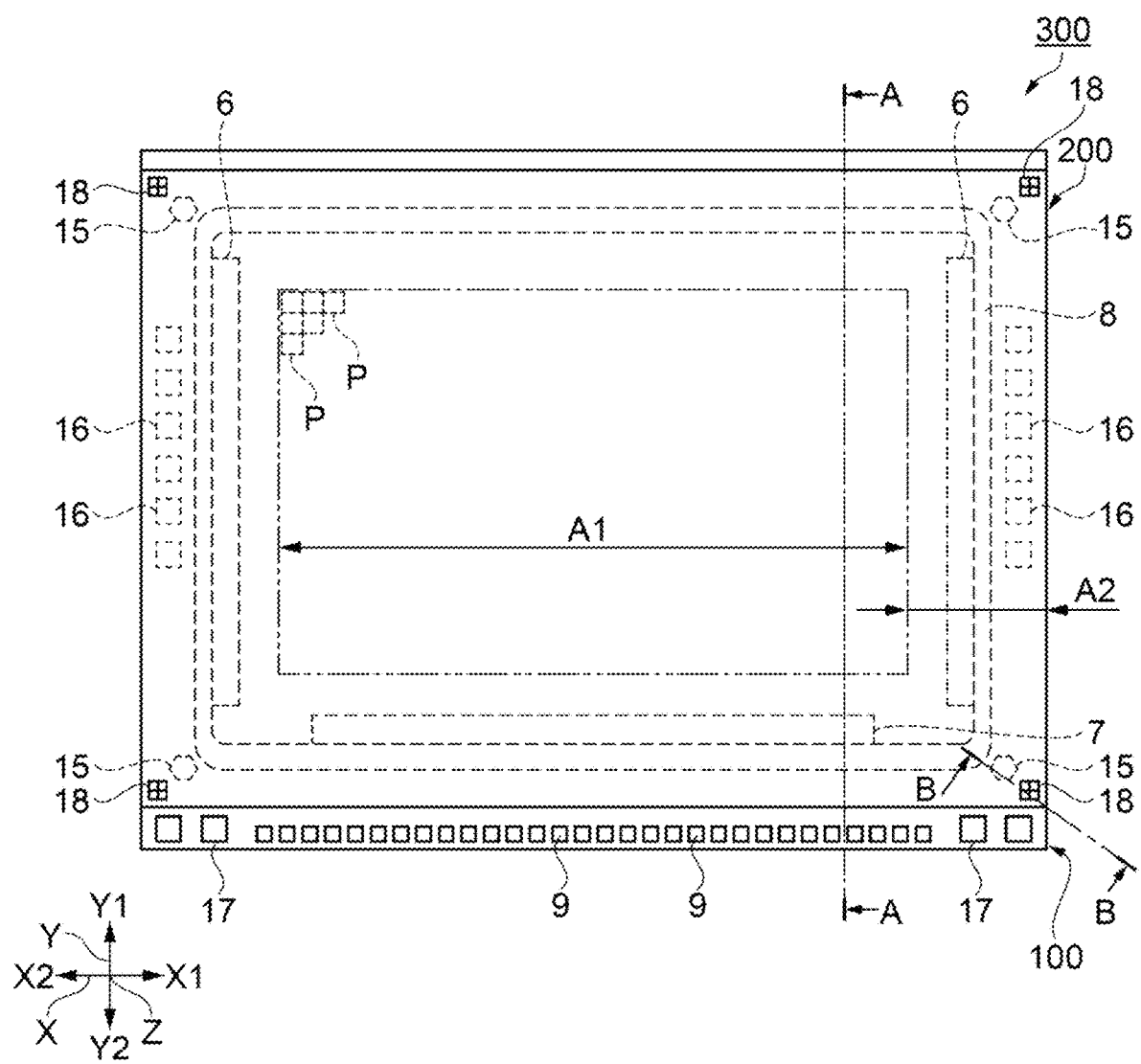
FIG. 1 is a plan view of an electro-optical apparatus according to Embodiment 1.
Figure 2:
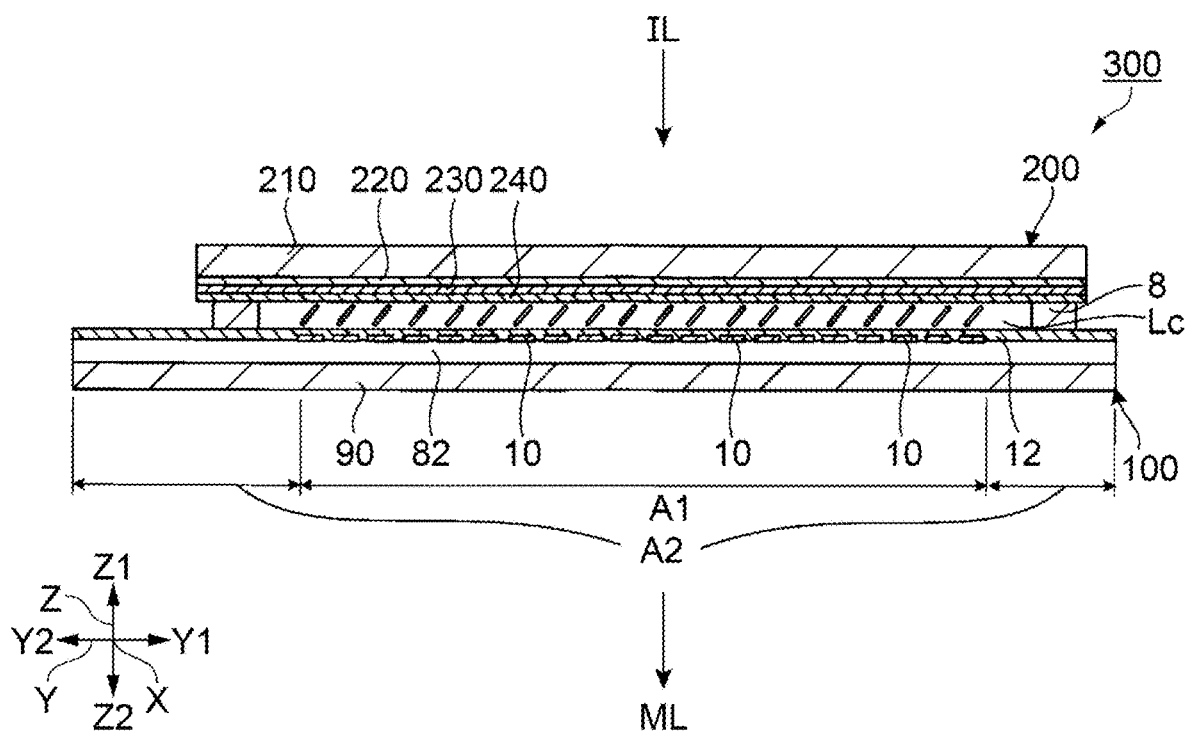
FIG. 2 is a cross-sectional view of the electro-optical apparatus taken along a line A-A of FIG. 1.

A structure of a liquid crystal apparatus 300 according to the embodiment will be described with reference to FIGS. 1 and 2. FIG. 1 is a plan view of the liquid crystal apparatus 300. FIG. 2 illustrates a schematic cross-sectional structure of the liquid crystal apparatus 300 taken along the line A-A of FIG. 1.

As illustrated in FIGS. 1 and 2, the liquid crystal apparatus 300 includes an optically transparent element substrate 100, an optically transparent opposed substrate 200, a sealing member 8 provided in a frame shape, and a liquid crystal layer Lc. Note that "optically transparent" means transmissivity to visible light, and may mean that a transmittance of visible light is 50% or greater.

The liquid crystal apparatus 300 includes a display region A1 for displaying images, and a peripheral region A2 located around an outside of the display region A1 in plan view.

A plurality of pixels P arranged in a matrix are provided in the display region A1. Note that while the shape of the liquid crystal apparatus 300 illustrated in FIG. 1 is a quadrangular shape, other shapes such as a circular shape may also be employed.

As illustrated in FIG. 2, the element substrate 100 and the opposed substrate 200 are disposed with the liquid crystal layer Lc interposed therebetween.

In the embodiment, the opposed substrate 200 is disposed on a light incident side of the liquid crystal layer Lc, and the element substrate 100 is disposed on a light emission side of the liquid crystal layer Lc. Incident light IL incident on the opposed substrate 200 is modulated at the liquid crystal layer Lc, and emitted from the element substrate 100 as modulated light ML.

The element substrate 100 includes a base 90, a plurality of interlayer insulating layers including an interlayer insulating layer 82, a pixel electrode 10, and an alignment film 12. In addition, although not illustrated in the drawings, a lens layer 34 described later is provided between the pixel electrode 10 and the interlayer insulating layer 82. In the embodiment, the base 90 is an example of a first substrate.

The base 90 is an optically transparent and insulating flat plate. The base 90 is a glass substrate or a quartz substrate, for example. A transistor described later is disposed between the plurality of interlayer insulating layers.

The pixel electrode 10 is optically transparent. The pixel electrode 10 is formed of a transparent conductive material such as indium tin oxide (ITO), indium zinc oxide (IZO), and fluorine-doped tin oxide (FTO), for example. A thickness direction of the pixel electrode 10 coincides with the Z1 direction or the Z2 direction.

The alignment film 12 is optically transparent and insulating. The alignment film 12 aligns liquid crystal molecules of the liquid crystal layer Lc. Examples of a material of the alignment film 12 include silicon oxide ($SiO_2$) and polyimide.

The opposed substrate 200 includes a base 210, an insulating layer 220, a common electrode 230, and an alignment film 240. Note that in the embodiment, the base 210 is an example of a second substrate.

The base 210 is an optically transparent and insulating flat plate. The base 210 is a glass substrate or a quartz substrate, for example.

The insulating layer 220 is optically transparent and insulating. Examples of a material of the insulating layer 220 include an inorganic material such as silicon oxide.

The common electrode 230 is an electrode disposed opposite to a plurality of the pixel electrodes 10, and may be referred to as an opposite electrode. The common electrode 230 includes a transparent conductive material such as ITO, IZO and, FTO, for example. The common electrode 230 and the pixel electrode 10 apply an electric field to the liquid crystal layer Lc.

The alignment film 240 is optically transparent and insulating.

The sealing member 8 is disposed between the element substrate 100 and the opposed substrate 200. The sealing member 8 is formed with an adhesive containing various curable resins such as an epoxy resin or the like. The sealing member 8 may include a gap member composed of an inorganic material such as glass.

The liquid crystal layer Lc is disposed in a region surrounded by the element substrate 100, the opposed substrate 200, and the sealing member 8. The liquid crystal layer Lc is an electro-optical layer of which an optical property changes in accordance with the electric field generated by the pixel electrode 10 and the common electrode 230. The liquid crystal layer Lc contains liquid crystal molecules with positive or negative dielectric anisotropy. The alignment of liquid crystal molecules changes in accordance with the electric field applied to the liquid crystal layer Lc. The liquid crystal layer Lc modulates the incident light IL in accordance with the applied electric field.

As illustrated in FIG. 1, a plurality of scan line driving circuits 6, a data line driving circuit 7, an external terminal 9, an inter-substrate conduction electrode 15, an inspection terminal 16, a monitor terminal 17, and an alignment mark 18 are disposed in the peripheral region A2 of the element substrate 100. In the embodiment, the alignment mark 18 is an example of an optical reading mark. Further, the external terminal 9, the inter-substrate conduction electrode 15, the inspection terminal 16, and the monitor terminal 17 are examples of peripheral electrodes. Note that the peripheral electrode is a generic term for the electrodes or the terminals provided in the peripheral region A2.

The external terminal 9 is a mounting terminal at which an external coupling line of a flexible printed circuit (FPC) or the like (not illustrated) is mounted. Various signals including an image signal, a synchronization signal, an inspection signal, a common potential, a power supply potential, and the like are supplied to the external terminal 9 from an outside via the external coupling line.

The inter-substrate conduction electrode 15 is electrically coupled to the common electrode 230 of the opposed substrate 200 through an inter-substrate conduction member (not illustrated). The inter-substrate conduction electrode 15 is supplied with the common potential, and the common potential is supplied to the opposed substrate 200 via the inter-substrate conduction member.

The inspection terminal 16 is used when presence or absence of a defect in a transistor, various wiring lines, or the like in a manufacturing process of the liquid crystal apparatus 300 or the like is determined.

The monitor terminal 17 is used, for example, to monitor a temporal characteristic change of the transistor. Information obtained by the monitor is used for controlling the liquid crystal apparatus 300, or the like.

The alignment mark 18 is an optical reading mark having a lattice-like shape called an inspection pattern. The alignment mark 18 is used, for example, when an inspection apparatus, a measurement apparatus, or the like positions the element substrate 100 in an inspection process or the like.

In the embodiment, the external terminal 9, the inter-substrate conduction electrode 15, the inspection terminal 16, and the monitor terminal 17 are provided at the same layer as the pixel electrode 10, and are formed by the same steps and of the same materials.

1.2. Electrical Configuration of Element Substrate

Figure 3:
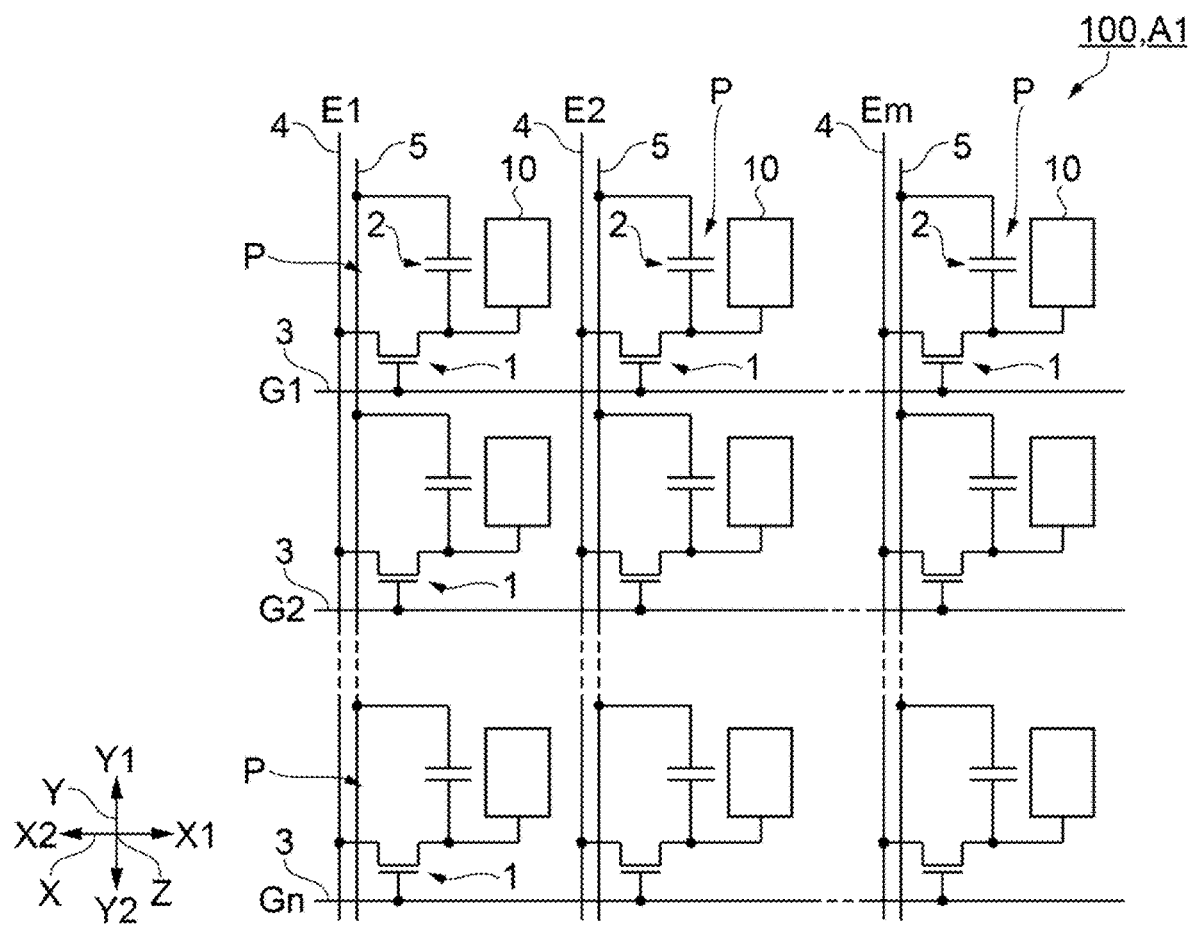
FIG. 3 is an equivalent circuit diagram illustrating an electrical configuration of an element substrate.

FIG. 3 is an equivalent circuit diagram illustrating an electrical configuration of the element substrate 100.

As illustrated in FIG. 3, a plurality of the transistors 1, n scan lines 3, m data lines 4, and m capacitance lines 5 are provided in the display region A1 of the element substrate 100. Each of n and m is an integer of 2 or greater. The transistor 1 is disposed corresponding to each of intersections of the n scan lines 3 and the m data lines 4.

Each of the n scan lines 3 extends in the X1 direction, and the n scan lines 3 are disposed side by side at even intervals in the Y1 direction. Each of the n scan lines 3 is electrically coupled to a gate electrode of the corresponding transistor 1. The n scan lines 3 are electrically coupled to the scan line driving circuit 6 illustrated in FIG. 1.

The scan line driving circuit 6 line-sequentially supplies scanning signals G1, G2, . . . , and Gn to the first to n-th scan lines 3.

Each of the m data lines 4 extends in the Y1 direction, and the m data lines 4 are disposed side by side at even intervals in the X1 direction. The m data lines 4 are electrically coupled to source regions of the plurality of corresponding transistors 1, respectively. The m data lines 4 are electrically coupled to the data line driving circuit 7 illustrated in FIG. 1.

The data line driving circuit 7 supplies image signals E1, E2, . . . , and Em to the first to m-th data lines 4.

The n scan lines 3 and the m data lines 4 are electrically isolated from each other and disposed in a grid form in plan view. A region surrounded by the adjacent two scan lines 3 and the adjacent two data lines 4 corresponds to the pixel P.

The pixel electrode 10 is provided for each pixel P. The pixel electrode 10 is electrically coupled to a drain region of the transistor 1.

Each of the m capacitance lines 5 extends in the Y1 direction, and the m capacitance lines 5 are disposed side by side at even intervals in the X1 direction. In addition, the m capacitance lines 5 are electrically isolated from the m data lines 4 and the n scan lines 3, and are disposed with spaces between them. A fixed potential such as a ground potential or the common potential is applied to each capacitance line 5, via the external terminal 9.

One electrode of a capacitive element 2 is electrically coupled to the capacitance line 5. Another electrode of the capacitive element 2 is electrically coupled to the pixel electrode 10, and maintains a potential of an image signal supplied to the pixel electrode 10.

1.3. Cross-Sectional Structure of Display Region of Element Substrate

Figure 4:
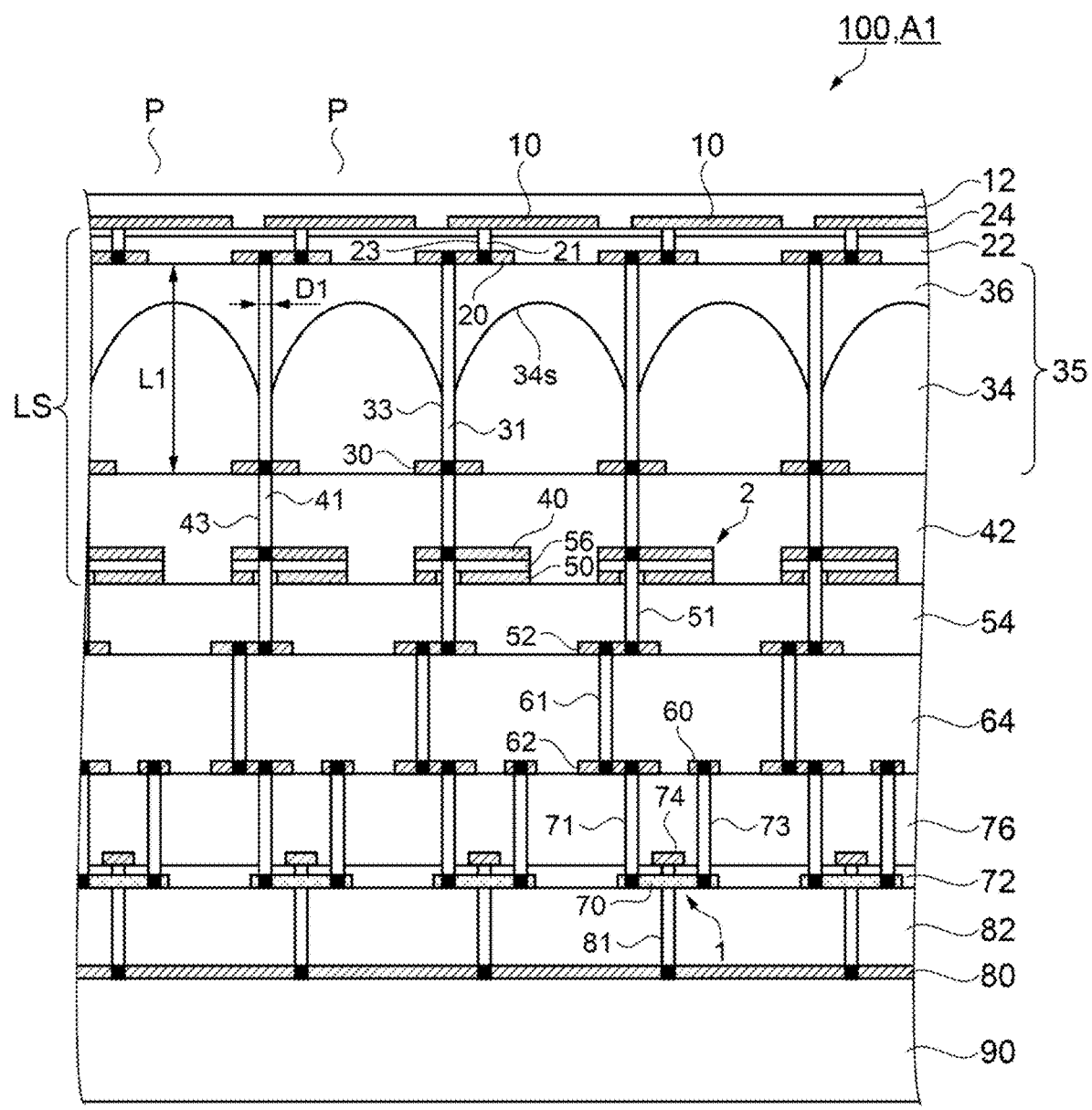
FIG. 4 is an explanatory diagram illustrating a cross-sectional structure of a display region of the element substrate.

FIG. 4 is an explanatory diagram illustrating a cross-sectional structure of the display region A1 of the element substrate 100, and illustrates a cross-sectional structure for a plurality of the pixels P provided in the display region A1.

As illustrated in FIG. 4, in the display region A1, the element substrate 100 has a cross-sectional structure in which insulating or conductive functional layers or functional films are stacked above the base 90.

A light shielding layer 80 is disposed between the base 90 and the interlayer insulating layer 82.

The light shielding layer 80 is formed of a conductive material with a light-shielding property. Note that by using a conductive material with a light-shielding property as a conductive functional layer or functional film, the conductive functional layer or functional film can function as a light shielding layer.

Examples of a conductive material with a light-shielding property include metal materials such as metals, metal nitride and metal silicide of tungsten (W), titanium (Ti), chromium (Cr), iron (Fe), aluminum (AL), and the like. The same shall apply hereinafter. Note that the "light-shielding property" means a light-shielding property to visible light, and means that a transmittance of visible light is less than 50%, more desirably 10% or less.

The light shielding layer 80 makes up a part of the scan line 3.

The interlayer insulating layer 82 is optically transparent and insulating. The interlayer insulating layer 82 is formed of an inorganic material such as silicon oxide ($SiO_2$), for example. Hereinafter, each interlayer insulating layer is formed of a similar material to that of the interlayer insulating layer 82.

The transistor 1 is provided above the interlayer insulating layer 82.

The transistor 1 includes a semiconductor layer 70 having a lightly doped drain (LDD) structure, a gate electrode 74, and a gate insulating layer 72.

The gate electrode 74 is provided above the semiconductor layer 70 via the gate insulating layer 72. The gate electrode 74 overlaps a channel region of the semiconductor layer 70.

The gate electrode 74 is formed by using polysilicon doped with impurities to enhance conductivity, for example. Note that the gate electrode 74 may be formed using a conductive material such as a metal, a metal silicide, or a metal compound.

The gate insulating layer 72 is composed of silicon oxide deposited by thermal oxidation, a chemical vapor deposition (CVD) method or the like, for example.

The gate electrode 74 and the light shielding layer 80 are electrically coupled through a contact hole 81. The contact hole 81 extends through the gate insulating layer 72 and the interlayer insulating layer 82.

An interlayer insulating layer 76 is provided above the transistor 1.

A conductive layer 60 and a relay layer 62 are provided above the interlayer insulating layer 76.

The conductive layer 60 and the relay layer 62 are provided at the same layer and are formed of a light-shielding conductive material. The conductive layer 60 and the relay layer 62 may each have a three-layer structure of titanium nitride, aluminum, and titanium nitride.

The conductive layer 60 constitutes a part of the data line 4. The conductive layer 60 is electrically coupled to a source region of the semiconductor layer 70 via a contact hole 73 extending through the interlayer insulating layer 76.

The relay layer 62 is electrically coupled to a drain region of the semiconductor layer 70 via a contact hole 71 extending through the interlayer insulating layer 76.

An interlayer insulating layer 64 is provided above the interlayer insulating layer 76, the conductive layer 60, and the relay layer 62.

A relay layer 52 is provided above the interlayer insulating layer 64. Each relay layer 52 is formed of a light-shielding conductive material.

The relay layer 52 is electrically coupled to the relay layer 62 through a contact hole 61 extending through the interlayer insulating layer 64.

An interlayer insulating layer 54 is provided above the interlayer insulating layer 64 and the relay layer 52.

The capacitive element 2 is provided above the interlayer insulating layer 54.

The capacitive element 2 includes a capacitive electrode 50 provided on the base 90 side, a capacitive electrode 40 provided on the pixel electrode 10 side, and a capacitance insulation film 56 provided between the capacitive electrode 40 and the capacitive electrode 50. Both the capacitive electrode 40 and the capacitive electrode 50 are formed of a light-shielding conductive material. The capacitance insulation film 56 is formed of a desired dielectric material.

The capacitive electrode 50 constitutes a part of the capacitance line 5.

The capacitive electrode 40 is electrically coupled to the relay layer 52 via a contact hole 51 extending through the interlayer insulating layer 54. In this manner, the capacitive electrode 40 is electrically coupled to the drain region of the transistor 1, and functions as a relay layer for electrically coupling the transistor 1 and the pixel electrode 10. In addition, an image signal supplied to the pixel electrode 10 is supplied to the capacitive electrode 40, and a fixed potential is supplied to the capacitive electrode 50 from the capacitance line 5, and thus, the capacitive element 2 functions as a retention capacitor.

An optical functional layer LS including a lens forming layer 35 is provided between the capacitive electrode 40 and the pixel electrode 10. Note that in the embodiment, the lens forming layer 35 is an example of a first lens forming layer.

The optical functional layer LS is provided for suppressing a light quantity loss. More specifically, a light path of transmitted light is adjusted to prevent the transmitted light past the pixel electrode 10 from resulting in loss by hitting a functional layer formed of a conductive material with a light-shielding property such as the data line 4 and the capacitance line 5.

The optical functional layer LS includes a light transmissive layer 42, the lens forming layer 35, a light transmissive layer 22, and a protective layer 24.

The light transmissive layer 42 is a light path length adjustment layer referred to as a path layer for adjusting a light path length. The light transmissive layer 42 is formed of an inorganic material such as silicon oxide. An upper surface of the light transmissive layer 42 is planarized by CMP or the like.

The lens forming layer 35 includes the lens layer 34 and a light transmissive layer 36.

The lens layer 34 is formed of an inorganic material with a different refractive index from that of the light transmissive layer 36, such as silicon oxynitride (SiON). The lens layer 34 includes a lens surface 34s with a predetermined shape at a surface on the pixel electrode 10 side. In the embodiment, the predetermined shape is a convex shape protruding toward the pixel electrode 10. The lens surface 34s is formed by etching an upper surface of the lens layer 34. Note that in the embodiment, the lens surface 34s is an example of a first lens.

The light transmissive layer 36 is formed above the lens layer 34. As with the light transmissive layer 42, the light transmissive layer 36 is formed of an inorganic material such as silicon oxide. Silicon oxide is deposited above the lens surface 34s and then planarized by CMP or the like, thereby forming the light transmissive layer 36.

The light transmissive layer 22 is provided above the lens layer 36.

The light transmissive layer 22 is a light path length adjustment layer, and is formed of an inorganic material such as silicon oxide as with the light transmissive layer 42.

The protective layer 24 is provided above the light transmissive layer 22. The protective layer 24 is composed of an optically transparent and hygroscopic inorganic material such as borosilicate glass (BSG), for example.

The pixel electrode 10 is provided above the protective layer 24. The alignment film 12 is provided above the pixel electrode 10.

The pixel electrode 10 and the capacitive electrode 40 are electrically coupled to each other, via a contact plug 21, a relay layer 20, a contact plug 31, a relay layer 30, and a contact plug 41. In this manner, the pixel electrode 10 is electrically coupled to the drain region of the transistor 1 via the capacitive electrode 40. Note that in the embodiment, the relay layer 30 is an example of a first relay electrode. Further, the contact plug 31 is an example of a first conductive member. Further, the relay layer 20 is an example of a third relay electrode.

A contact hole 23 extending through the protective layer 24 and the light transmissive layer 22 is provided between the pixel electrode 10 and the relay layer 20.

The contact hole 23 is provided for electrically coupling the pixel electrode 10 and the contact plug 31. The contact plug 21 serving as a conductive member referred to as a pixel contact plug is provided in the contact hole 23. The contact plug 21 is formed of a light-shielding conductive material such as tungsten.

The relay layer 20 is provided between the light transmissive layer 22 and the light transmissive layer 36. When tungsten is used for the contact plug 21, the relay layer 20 may be formed of a material, for example, titanium nitride or the like, with favorable electrical coupling with tungsten.

The contact plug 31 is provided in a contact hole 33 extending through the lens forming layer 35. In other words, the lens forming layer 35 includes the contact hole 33. Note that in the embodiment, the contact hole 33 is an example of a first contact hole.

A length L1 indicates a depth of the contact hole 33, or a layer thickness of the lens forming layer 35. Further, a length D1 indicates an inside diameter of the contact hole 33, and indicates an inside diameter at a position closer to the pixel electrode 10.

The contact plug 31 electrically couples the contact plug 21 and the relay layer 30. The contact plug 31 is formed of a light-shielding conductive material. In the embodiment, the contact plug 31 is formed of tungsten or a conductive material containing tungsten.

Tungsten is suitable for forming a contact plug having a fine structure with a high aspect ratio as compared with other conductive materials. Therefore, by using tungsten or a conductive material containing tungsten as the material of the contact plug 31, difficulty of processing the contact plug 31 can be reduced.

The relay layer 30 is provided between the light transmissive layer 42 and the lens layer 34. When tungsten is used for the material of the contact plug 31, the relay layer 30 may be formed of a material with favorable electrical coupling with tungsten, such as nitride titanium.

A contact hole 43 extending through the light transmissive layer 42 is provided between the relay layer 30 and the capacitive electrode 40.

The contact hole 43 is provided to electrically couple the relay layer 30 and the capacitive electrode 40, and the contact plug 41 as a conductive member is provided in the contact hole 43. The contact plug 41 is formed of a light-shielding conductive material such as tungsten.

1.4. Cross-Sectional Structure of Peripheral Region of Element Substrate

Figure 5:
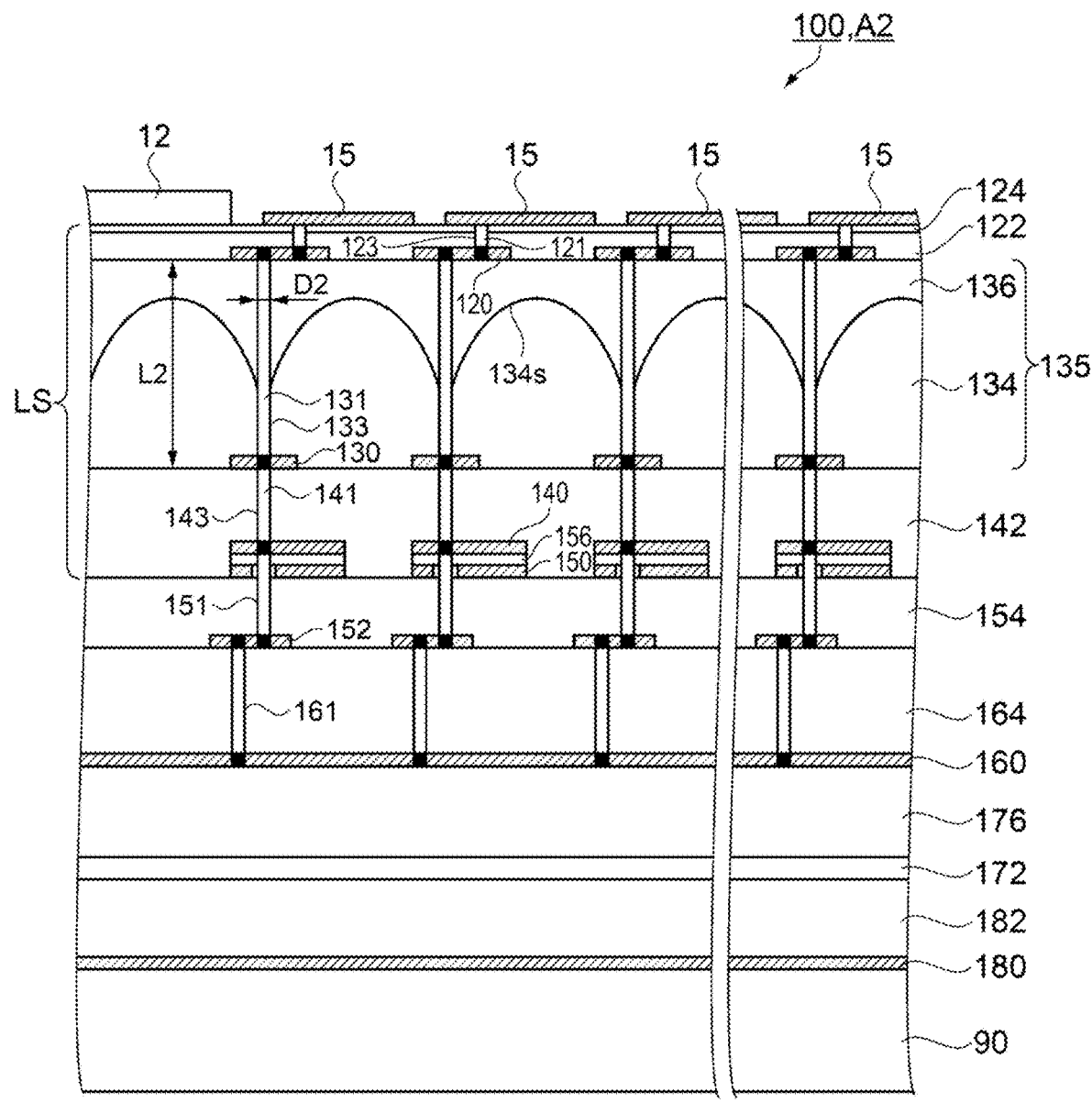
FIG. 5 is an explanatory diagram illustrating a cross-sectional structure of a peripheral region of the element substrate.

FIG. 5 is an explanatory diagram illustrating a cross-sectional structure of the peripheral region A2 of the element substrate 100, and particularly, illustrates a cross-sectional structure of the inter-substrate conduction electrode 15 provided in the peripheral region A2.

As illustrated in FIG. 5, in the peripheral region A2, the element substrate 100 has a cross-sectional structure in which insulating or conductive functional layers or functional films are stacked above the base 90, as in the case of the display region A1.

A light shielding layer 180 is provided above the base 90.

The light shielding layer 180 is provided at the same layer as the light shielding layer 80 in the display region A1, and is formed by the same step and with the same or similar material.

Similarly, each configuration of the peripheral region A2 is provided at the same layer as a corresponding configuration of the display region A1, and is formed by the same step and with the same or similar material.

Specifically, an interlayer insulating layer 182 and the interlayer insulating layer 82, a gate insulating layer 172 and the gate insulating layer 72, an interlayer insulating layer 176 and the interlayer insulating layer 76, an interlayer insulating layer 164 and the interlayer insulating layer 64, and an interlayer insulating layer 154 and the interlayer insulating layer 54 are provided in the same layers, respectively, and are formed of the same or similar material in the same step. Further, a light transmissive layer 142 and the light transmissive layer 42, a lens layer 134 and the lens layer 34, a light transmissive layer 136 and the light transmissive layer 36, a light transmissive layer 122 and the light transmissive layer 22, and a protective layer 124 and the protective layer 24 are provided in the same layers, respectively, and are formed of the same or similar material in the same step.

Here, the optical functional layer LS includes the light transmissive layer 142, the lens forming layer 135, the light transmissive layer 122, and the protective layer 124 in the peripheral region A2, and the lens forming layer 135 includes the lens layer 134 having a lens surface 134s, and the light transmissive layer 136. The lens surface 134s has the same predetermined shape as that of the lens surface 34s. Note that in the embodiment, the lens forming layer 135 is an example of a second lens forming layer, and the lens surface 134s is an example of a second lens.

Further, a conductive layer 160 and the conductive layer 60, a relay layer 152 and the relay layer 52, a conductive layer 150 and the capacitive electrode 50, an insulating film 156 and the capacitance insulation film 56, a relay layer 140 and the capacitive electrode 40, a relay layer 130 and the relay layer 30, a relay layer 120 and the relay layer 20, and the inter-substrate conduction electrode 15 and the pixel electrode 10 are provided in the same layers, respectively, and are formed of the same or similar material in the same step. Note that in the embodiment, the relay layer 130 is an example of a second relay electrode. Further, the relay layer 120 is an example of a fourth relay electrode.

In the embodiment, the inter-substrate conduction electrode 15 and the pixel electrode 10, the relay layer 120 and the relay layer 20, the relay layer 130 and the relay layer 30, the relay layer 140 and the capacitive electrode 40, the insulating film 156 and the capacitance insulation film 56, the conductive layer 150 and the capacitive electrode 50, and the relay layer 152 and the relay layer 52 are formed in the same or similar shapes and in the same or similar sizes, respectively. Further, the conductive layer 160 is provided continuously.

Further, a contact hole 123 and the contact hole 23, a contact hole 133 and the contact hole 33, a contact hole 143 and the contact hole 43, a contact hole 151 and the contact hole 51, and a contact hole 161 and the contact hole 61 are provided in the same layers, respectively, to have the same or similar diameters and the same or similar depths, and in the same steps, respectively. Note that in the embodiment, the contact hole 133 is an example of a second contact hole.

Additionally, a length L2 indicates a depth of the contact hole 133 or a layer thickness of the lens forming layer 135. The length L2 has a value that is the same as or similar to that of the length L1.

Further, a length D2 indicates an inside diameter of the contact hole 133, and indicates an inside diameter at a position closer to the inter-substrate conduction electrode 15. The length D2 has a value that is the same as or similar to that of the length D1.

Further, a contact plug 121 and the contact plug 21, a contact plug 131 and the contact plug 31, and a contact plug 141 and the contact plug 41 are provided in the same layers, respectively, and are formed of the same or similar materials in the same steps, respectively. Note that in the embodiment, the contact plug 131 is an example of a second conductive member.

The inter-substrate conduction electrode 15 and the conductive layer 160 are electrically coupled to each other via the contact plug 121, the relay layer 120, the contact plug 131, the relay layer 130, the contact plug 141, the relay layer 140, the contact hole 151, the relay layer 152, and the contact hole 161. Further, the conductive layer 160 is electrically coupled to the external terminal 9 via a conductive layer and a conductive member (not illustrated), and is applied with a fixed potential such as the common potential or the ground potential.

In the embodiment, the transistor 1 is not provided in a region overlapping the inter-substrate conduction electrode 15 in plan view, but the transistor 1 may be provided.

Further, the external terminal 9, the inspection terminal 16, and the monitor terminal 17 are also formed in the same manner as the inter-substrate conduction electrode 15. That is, the lens forming layer 135 including the lens layer 134 having the lens surface 134s is provided between the external terminal 9, the inspection terminal 16, and the monitor terminal 17, and the base 90.

1.5. Planar Structure of Display Region of Element Substrate

Figure 6:
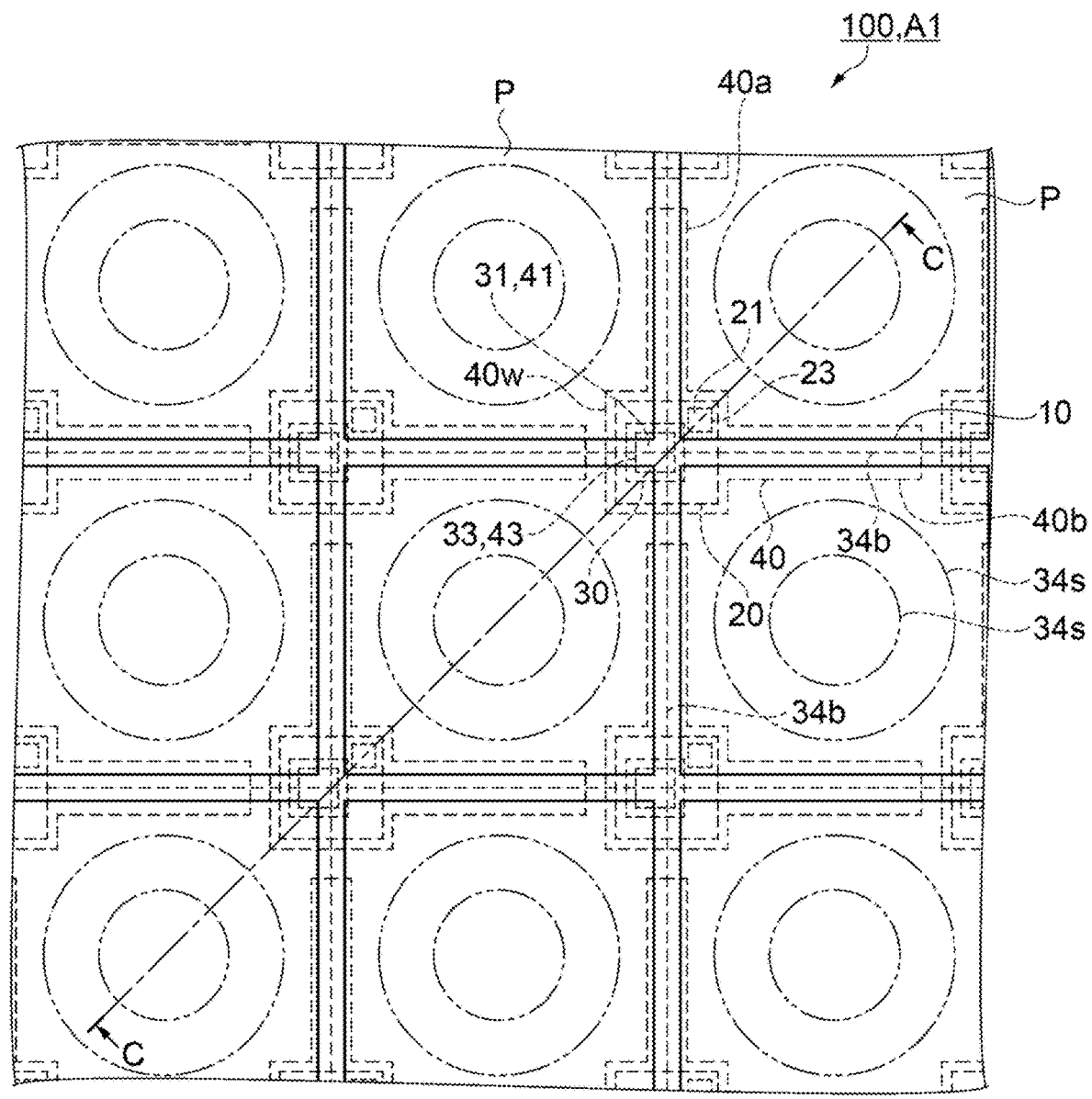
FIG. 6 is a plan view illustrating a part of the display region of the element substrate.

FIG. 6 is a plan view illustrating a part of the display region A1 of the element substrate 100, and illustrates a planar structure of the display region A1, in plan view of the display region A1 of the element substrate 100 from the liquid crystal layer Lc side in the Z2 direction. Note that although details will be described later, in the peripheral region A2, a region in which the peripheral electrode such as the inter-substrate conduction electrode 15 is provided also has a similar planar structure.

In FIG. 6, an outer edge of the pixel electrode 10 is indicated by a solid line, and an outer edge of a configuration included in the optical functional layer LS provided closer to the base 90 than the pixel electrode 10 is indicated by a broken line. In addition, a curved surface shape of the lens surface 34s is indicated by double circle with chain double-dashed lines, and a boundary where the adjacent two lens surfaces 34s are in contact with each other is indicated by a boundary line 34b.

As illustrated in FIG. 6, the pixel electrode 10 has a predetermined size, and a shape thereof is a square. Further, the pixel electrodes 10 are disposed in a matrix along the X-axis and the Y-axis at a predetermined pitch.

In the embodiment, as for the predetermined size of the pixel electrode 10, each of vertical and horizontal lengths is about 6 μm, and the predetermined pitch is about 7 μm. Note that the predetermined size and the predetermined pitch of the pixel electrode 10 described above are merely examples, and may be appropriately changed. Further, the predetermined size of the pixel electrode 10 corresponds to a first size.

The lens surface 34s is provided for each pixel electrode 10. The lens surfaces 34s have a predetermined size and are provided at a predetermined pitch that is the same as or similar to that of the pixel electrodes 10.

In the embodiment, as for the predetermined size of the lens surface 34s, each of vertical and horizontal lengths is about 7 μm, and the predetermined pitch is about 7 μm. Note that the predetermined size and the predetermined pitch of the lens surface 34s described above are merely examples, and may be appropriately changed.

A light blocking region is provided between the pixel electrodes 10 adjacent to each other, and a center side of the pixel electrode 10 is an opening region where light is transmitted. The contact plug 21, the contact plug 31, the relay layer 30, and the capacitive electrode 40 are provided in the light blocking region. In addition, the transistor 1, the gate electrode 74, the scan line 3, the data line 4, the capacitance line 5, and the like (not illustrated) are provided in the light blocking region.

The contact plug 21 is provided at a position overlapping the pixel electrode 10, in the embodiment, at a position overlapping a lower left corner of the drawing of four corners of the pixel electrode 10.

In plan view, the contact hole 23 is provided at a position not overlapping the contact hole 33. When the contact hole 23 is provided at a position not overlapping the contact hole 33 in the above-described manner, deposition of the pixel electrode 10 provided above the contact hole 23 can be improved in comparison with a case where the contact hole 23 is provided at a position overlapping the contact hole 33.

The contact hole 33 and the contact plug 31 are provided at a gap surrounded by corners of the respective four adjacent pixel electrodes 10 in plan view.

A plurality of the contact plugs 31 are disposed at a predetermined pitch. In the embodiment, the predetermined pitch is about 7 μm. Note that the predetermined pitch of the contact plugs 31 described above is merely an example, and may be changed as appropriate.

The relay layer 30 is provided at a position overlapping the contact hole 33 and the contact plug 31 in plan view. The relay layer 30 has a predetermined size, and a shape thereof is a square. In the embodiment, as for the size of the relay layer 30, each of vertical and horizontal lengths is about 2 μm. Note that the predetermined size of the relay layer 30 described above is merely an example, and may be appropriately changed. The predetermined size of the relay layer 30 corresponds to a third size.

The contact plug 41 is provided at a position overlapping the contact hole 33 and the contact plug 31. In the embodiment, the contact plug 41 substantially entirely overlaps the contact plug 31 in plan view.

In plan view, the capacitive electrode 40 is provided at a position overlapping the relay layer 30, the contact plug 41, the contact hole 43, the contact plug 31, the contact hole 33, the contact plug 21, and the contact hole 23.

The capacitive electrode 40 includes a wide part 40w, a protruding part 40a protruding along the Y1 direction from the wide part 40w, and a protruding part 40b protruding along the X1 direction from the wide part 40w. In plan view, the wide part 40w has a size and a shape that overlap the entirety of the relay layer 30.

In the embodiment, the shape of each of the contact hole 23, the contact hole 33, the contact hole 43, contact plug 21, the contact plug 31, and the contact plug 41 is rectangular in plan view, but this is not limitative, and the shape may be a circular shape, for example.

1.6. Planar Structure of Peripheral Region of Element Substrate

In the peripheral region A2, a region where the peripheral electrodes are provided has a planar structure similar to that illustrated in FIG. 6. In other words, when the reference numerals in the configuration of the display region A1 in FIG. 6 are replaced with the corresponding reference numerals in the configuration of the peripheral region A2, the plan view of the region where the peripheral electrodes of the peripheral region A2 are provided is obtained.

Specifically, it is sufficient that the pixel electrode 10 is replaced with the inter-substrate conduction electrode 15, the external terminal 9, the inspection terminal 16, or the monitor terminal 17.

Further, similarly, it is sufficient that the relay layer 20 is replaced with the relay layer 120, the relay layer 30 is replaced with the relay layer 130, and the capacitive electrode 40 is replaced with the relay layer 140. Further, it is sufficient that the contact plug 21 is replaced with the contact plug 121, the contact plug 31 is replaced with the contact plug 131, and the contact plug 41 is replaced with the contact plug 141. Further, it is sufficient that the contact hole 23 is replaced with the contact hole 123, the contact hole 33 is replaced with the contact hole 133, and the contact hole 43 is replaced with the contact hole 143. Further, it is sufficient that the lens surface 34s is replaced with the lens surface 134s.

Like the pixel electrode 10, the inter-substrate conduction electrode 15 has a predetermined size, and a shape thereof is similarly a square. Further, the inter-substrate conduction electrodes 15, as in the case of the pixel electrode 10, are disposed in a matrix along the X-axis and the Y-axis at a predetermined pitch.

In the embodiment, as for the predetermined size of the inter-substrate conduction electrode 15, each of vertical and horizontal lengths is about 6 μm, and the predetermined pitch is about 7 μm. Note that the predetermined size and the predetermined pitch of the inter-substrate conduction electrode 15 described above are merely examples, and may be appropriately changed.

In plan view, as in the case of the contact hole 33 and the contact plug 31, the contact hole 133 and the contact plug 131 are provided in a gap surrounded by corners of the respective four adjacent inter-substrate conduction electrodes 15.

A plurality of the contact plugs 131 are disposed at a predetermined pitch, as in the case of the plurality of contact plugs 31.

In the embodiment, the predetermined pitch of the plurality of contact plugs 131 is about 7 μm, as in the case of the predetermined pitch of the plurality of contact plugs 31. Note that the predetermined pitch of the contact plugs 131 described above is merely an example, and may be changed as appropriate.

The external terminal 9, the inspection terminal 16, and the monitor terminal 17 are configured in the same manner as the inter-substrate conduction electrode 15 described above.

Figure 7:
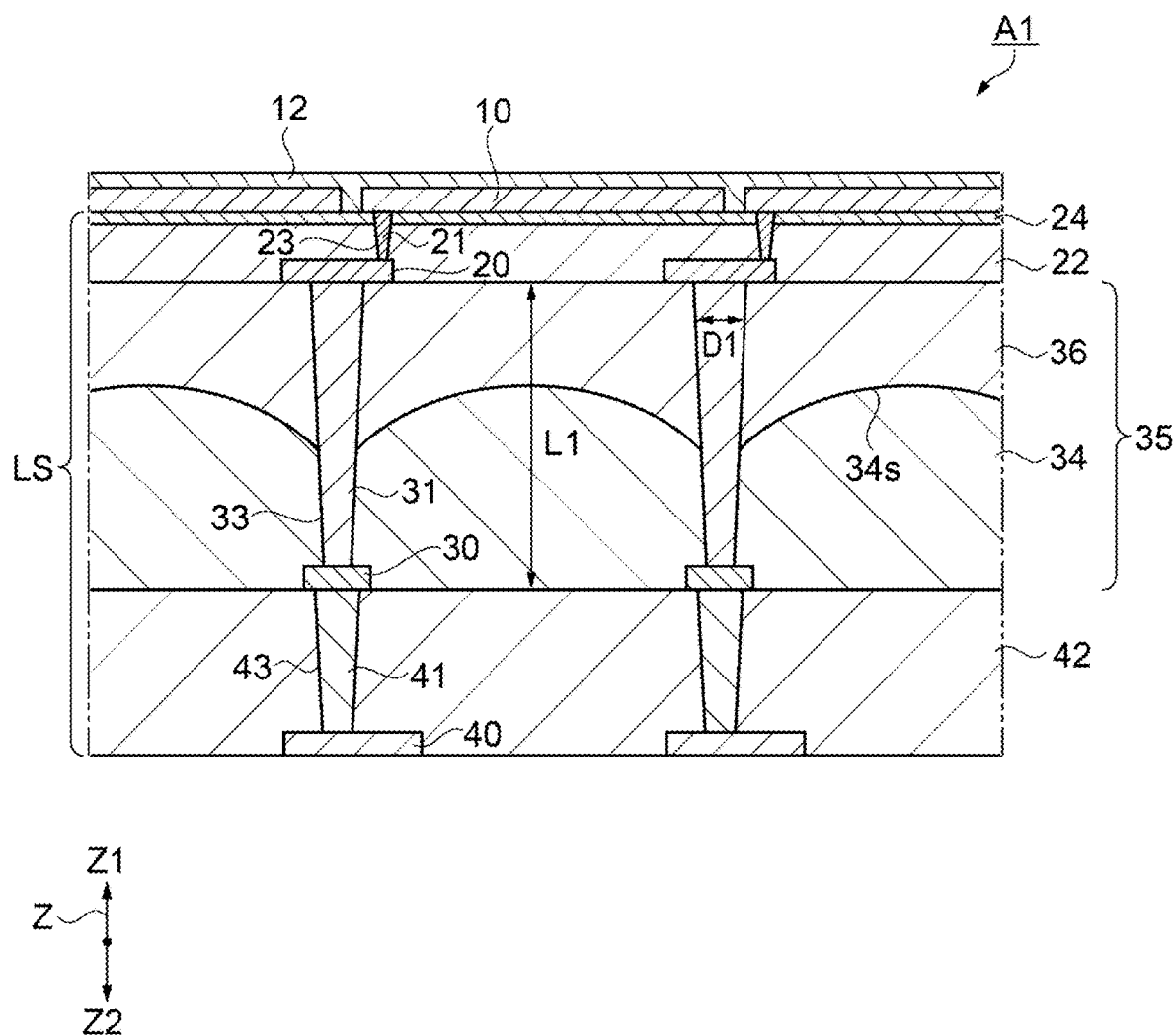
FIG. 7 is an explanatory diagram illustrating a cross-sectional structure taken along a line C-C of FIG. 6.

1.7. Cross-sectional Structure of Optical Functional Layer of Display Region of Element Substrate FIG. 7 is a cross-sectional view taken along the line C-C of FIG. 6, and illustrates a cross-sectional structure of the optical functional layer LS.

A total of layer thicknesses of the light transmissive layer 22 and the protective layer 24 is from about 0.3 μm to about 1 μm, and suitably about 0.5 μm.

The contact hole 23 has a shape of an inverted quadrangular truncated pyramid, extends through the light transmissive layer 22 and the protective layer 24, and exposes the relay layer 20 at a bottom of the contact hole 23.

An inside diameter of the contact hole 23 is about 1 μm. The depth of the contact hole 23 is, as in the case of the total of layer thicknesses of the light transmissive layer 22 and the protective layer 24, from about 0.3 μm to about 1 μm, and suitably about 0.5 μm.

Therefore, an aspect ratio=depth/inside diameter of the contact hole 23 is from about 0.3 to about 1, and suitably about 0.5.

The layer thickness L1 of the lens forming layer 35 is from about 3 μm to about 13 μm, and suitably about 7 μm.

The contact hole 33 has a shape of an inverted quadrangular truncated pyramid, extends through the lens forming layer 35, and exposes the relay layer 30 at a bottom of the contact hole 33.

The inside diameter D1 of the contact hole 33 is about 1 μm. Further, the depth L1 of the contact hole 33 is from about 3 μm to about 13 μm, and suitably about 7 μm, as in the case of the lens forming layer 35.

Therefore, an aspect ratio=depth L1/inside diameter D1 of the contact hole 33 is from about 3 to about 13, and suitably about 7. In the embodiment, the aspect ratio of the contact hole 33 corresponds to a predetermined aspect ratio.

A layer thickness of the light transmissive layer 42 is from about 3 μm to about 10 μm, and suitably about 5 μm.

The contact hole 43 has a shape of an inverted quadrangular truncated pyramid, extends through the light transmissive layer 42, and exposes the capacitive electrode 40 at a bottom of the contact hole 43.

The inside diameter of the contact hole 43 is about 1 μm. Further, the depth of the contact hole 43 is from about 3 μm to about 10 μm, and suitably about 5 μm, as in the case of the light transmissive layer 42. Therefore, an aspect ratio=depth/inside diameter of the contact hole 43 is from about 3 to about 10, and suitably about 5.

In the embodiment, the lens forming layer 35 is formed to have a layer thickness equal to or greater than that of the light transmissive layer 42. Further, the layer thickness of the lens forming layer 35 is greater than those of the other interlayer insulating layers.

Therefore, the contact hole 33 is a contact hole having the highest aspect ratio as compared to the contact holes provided at the other layers.

1.8. Cross-Sectional Structure of Optical Functional Layer of Peripheral Region of Element Substrate In the peripheral region A2, the region where the peripheral electrodes are provided has a cross-sectional structure similar to that illustrated in FIG. 7. In other words, when the reference numerals in the configuration of the display region A1 in FIG. 7 are replaced with the corresponding reference numerals in the configuration of the peripheral region A2, the cross-sectional view of the region where the peripheral electrodes of the peripheral region A2 are provided is obtained.

Specifically, it is sufficient that the light transmissive layer 42 is replaced with the light transmissive layer 142, the lens layer 34 is replaced with the lens layer 134, the light transmissive layer 36 is replaced with the light transmissive layer 136, the light transmissive layer 22 is replaced with the light transmissive layer 122, and the protective layer 24 is replaced with the protective layer 124.

A total of layer thicknesses of the light transmissive layer 122 and the protective layer 124 is similar to the case of the light transmissive layer 22 and the protective layer 24.

A shape of the contact hole 123 is, as in the case of the contact hole 23, an inverted quadrangular truncated pyramid.

An inside diameter of the contact hole 123 is, as in the case of the contact hole 23, about 1 µm. Further, the depth of the contact hole 123 is from about 0.3 µm to about 1 µm, as in the case of the contact hole 23.

Therefore, as in the case of the contact hole 23, an aspect ratio=depth/inside diameter of the contact hole 123 is from about 0.3 to about 1, and suitably about 0.5.

The layer thickness L2 of the lens forming layer 135 is, as in the case of the lens forming layer 35, from about 3 µm to about 13 µm, and suitably about 7 µm.

A shape of the contact hole 133 is, as in the case of the contact hole 33, an inverted quadrangular truncated pyramid.

An inside diameter D2 of the contact hole 133 is, as in the case of the inside diameter D1 of the contact hole 33, about 1 µm. Further, as in the case of the depth L1 of the contact hole 33, the depth L2 of the contact hole 133 is from about 3 µm to about 13 µm, and suitably about 7 µm.

Therefore, as in the case of the contact hole 33, an aspect ratio=depth L2/inside diameter D2 of the contact hole 133 is from about 3 to about 13, and suitably about 7. In the embodiment, the aspect ratio of the contact hole 133 corresponds to the predetermined aspect ratio.

A layer thickness of the light transmissive layer 142 is, as in the case of the light transmissive layer 42, from about 3 µm to about 10 µm, and suitably about 5 µm.

A shape of the contact hole 143 is, as in the case of the contact hole 43, an inverted quadrangular truncated pyramid.

An inside diameter of the contact hole 143 is, as in the case of the contact hole 43, about 1 µm. Further, as in the case of the contact hole 43, a depth of the contact hole 143 is from about 3 µm to about 10 µm, and suitably about 5 µm.

Therefore, as in the case of the contact hole 43, an aspect ratio=depth/inside diameter of the contact hole 143 is from about 3 to about 10, and suitably about 5.

In the embodiment, the lens forming layer 135 is formed to have a layer thickness equal to or greater than that of the light transmissive layer 142, as in the case of the lens forming layer 35. In addition, the layer thickness of the lens forming layer 135 is greater than those of the other interlayer insulating layers, as in the case of the lens forming layer 35.

Therefore, as in the case of the contact hole 33, the contact hole 133 is a contact hole having the highest aspect ratio as compared to the contact holes provided in the other layers.

1.9. Modifications

Various modifications may be made for the above-described embodiment of the cross-sectional structure of the peripheral region A2 of the element substrate 100. Specific aspects of the modification will be exemplified below.

1.9.1. Modification 1

Figure 8:
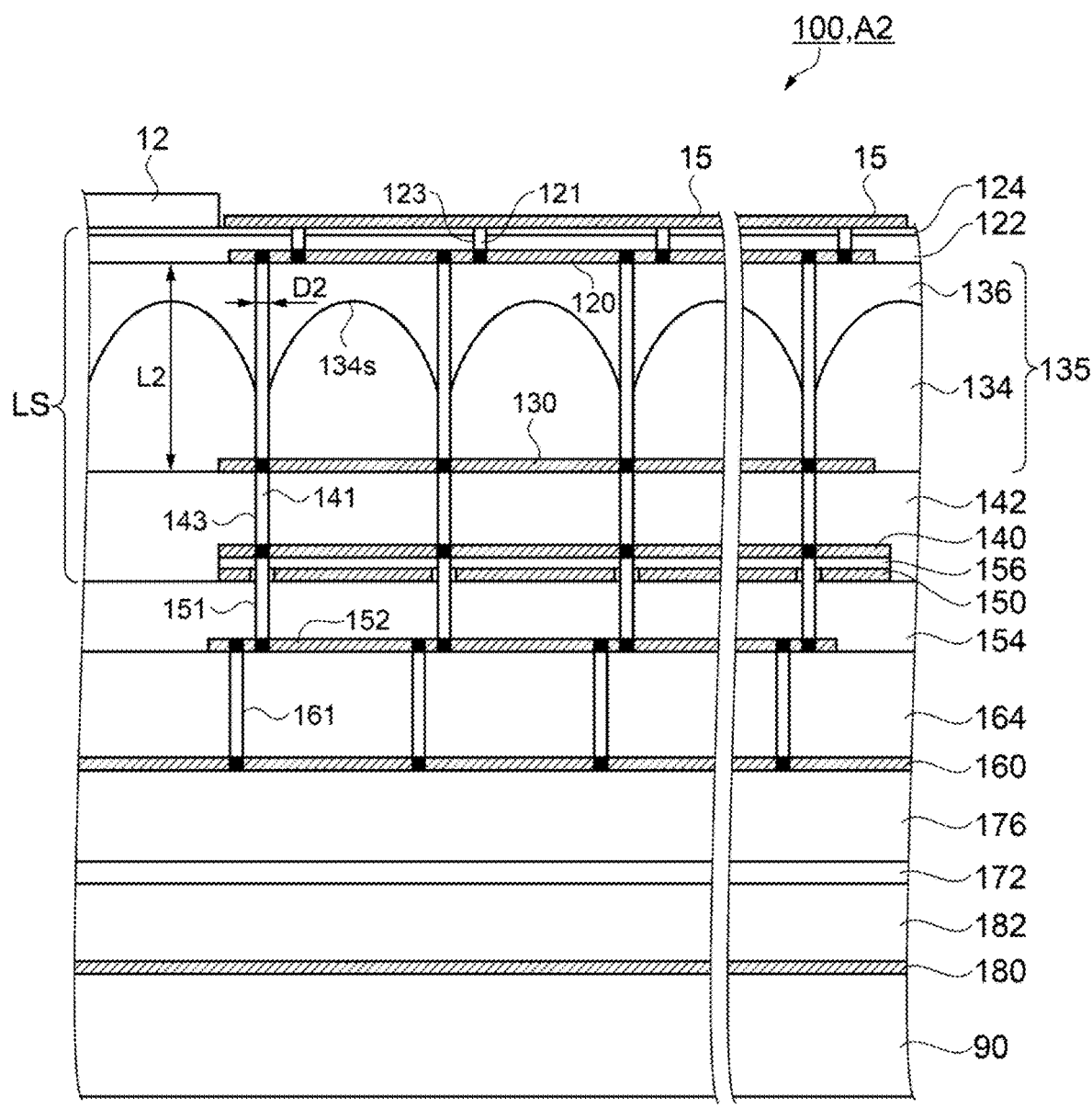
FIG. 8 is an explanatory diagram illustrating a cross-sectional structure of a peripheral region according to Modification 1.

FIG. 8 is an explanatory diagram illustrating a cross-sectional structure of the peripheral region A2 according to Modification 1, and illustrates a modification of the cross-sectional structure of the peripheral region A2 of the element substrate 100 illustrated in FIG. 5. FIG. 8 particularly illustrates a cross-sectional structure of the inter-substrate conduction electrode 15.

In Modification 1, shapes of the inter-substrate conduction electrode 15 and conductive layers overlapping the inter-substrate conduction electrode 15 are different from those in the example illustrated in FIG. 5.

In Modification 1, the inter-substrate conduction electrode 15 is continuously provided. Specifically, the plurality of inter-substrate conduction electrodes 15 illustrated in FIG. 5 are coupled to form the one inter-substrate conduction electrode 15. In other words, in Modification 1, when the size of the pixel electrode 10 in plan view is defined as the first size, the inter-substrate conduction electrode 15 has a second size greater than the first size.

In Modification 1, the second size is size of a polygon with each diagonal having a length of about 600 µm. Note that the second size of the inter-substrate conduction electrode 15 described above is merely an example, and may be appropriately changed.

Similarly, the relay layer 120, the relay layer 130, the relay layer 140, the conductive layer 150, the relay layer 152, the conductive layer 160, and the insulating film 156 are also continuously provided.

In Modification 1, when the size of the relay layer 30 in plan view is defined as the third size, the relay layer 130 has a fourth size greater than the third size. In Modification 1, the fourth size is substantially the same as the second size of the inter-substrate conduction electrode 15 described above.

In Modification 1, cross-sectional structures of the other peripheral electrodes such as the external terminal 9, the inspection terminal 16, and the monitor terminal 17 are similarly configured.

Specifically, the external terminal 9 is continuously provided. In other words, in Modification 1, when the size of the pixel electrode 10 in plan view is defined as the first size, the external terminal 9 has the second size greater than the first size.

In Modification 1, the second size of the external terminal 9 is a size of a rectangle having a vertical length of about 500 µm and a horizontal length of 40 µm. Note that the second size of the external terminal 9 described above is merely an example and may be changed as appropriate.

The inspection terminal 16 is continuously provided. In other words, in Modification 1, when the size of the pixel electrode 10 in plan view is defined as the first size, the inspection terminal 16 has the second size greater than the first size.

In Modification 1, the second size of the inspection terminal 16 is a size of a rectangle having each of vertical and horizontal lengths of about 150 µm. Note that the second size of the inspection terminal 16 described above is merely an example and may be changed as appropriate.

The monitor terminal 17 is continuously provided. In other words, in Modification 1, when the size of the pixel electrode 10 in plan view is defined as the first size, the monitor terminal 17 has the second size greater than the first size.

In Modification 1, the second size of the monitor terminal 17 is a size of a rectangle having each of vertical and horizontal lengths of about 100 μm. Note that the second size of the monitor terminal 17 described above is merely an example, and may be changed as appropriate.

1.9.2. Modification 2

Figure 9:
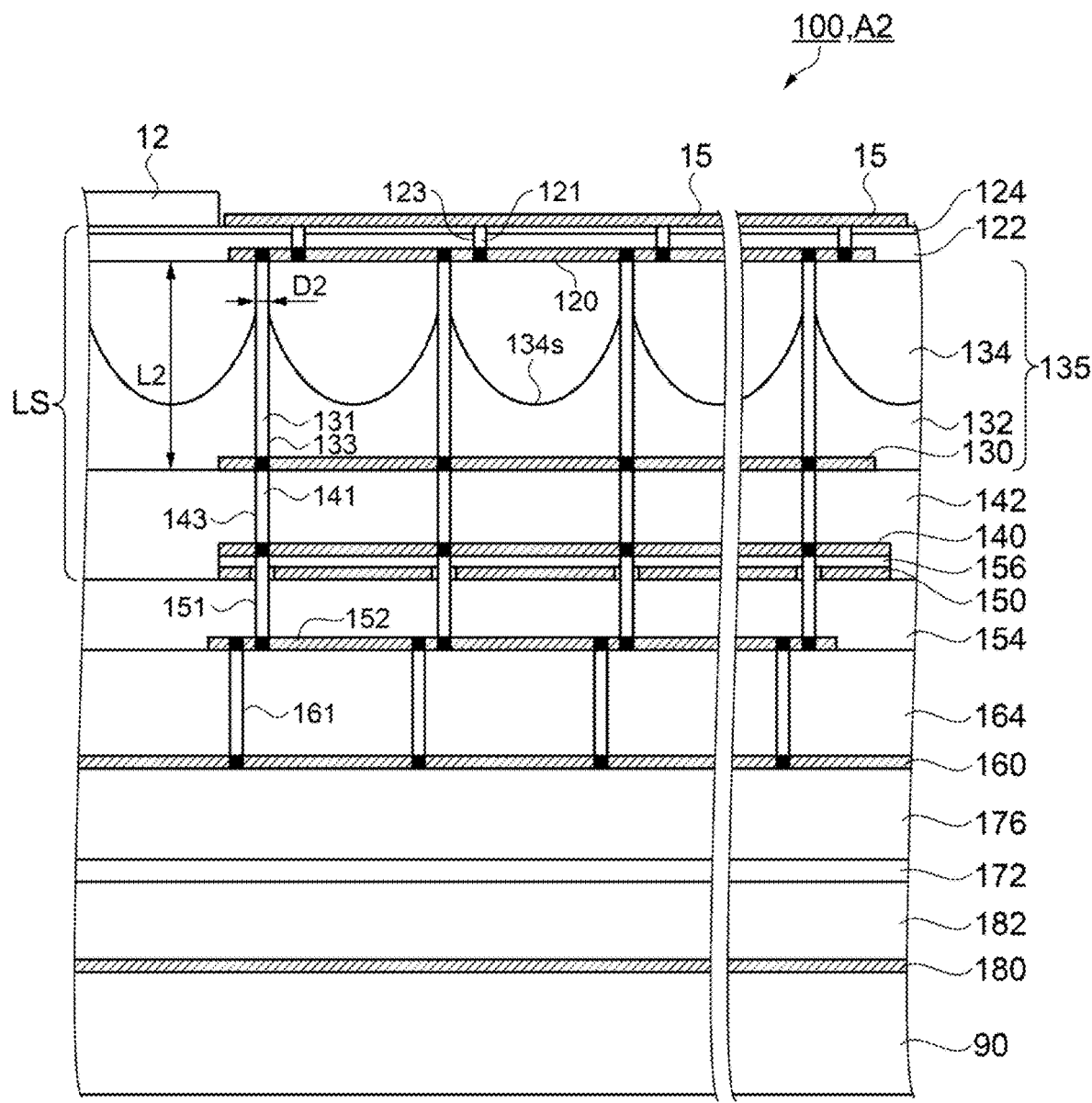
FIG. 9 is an explanatory diagram illustrating a cross-sectional structure of a peripheral region according to Modification 2.

FIG. 9 is an explanatory diagram illustrating a cross-sectional structure according to Modification 2, and illustrates a modification of the cross-sectional structure of the peripheral region A2 of the element substrate 100 illustrated in FIG. 5. FIG. 9 particularly illustrates a cross-sectional structure of the inter-substrate conduction electrode 15.

In Modification 2, a configuration of the lens forming layer 135 is different from that of the cross-sectional structure of Modification 1 illustrated in FIG. 8.

In Modification 2, the lens forming layer 135 includes a light transmissive layer 132 provided on the base 90 side and the lens layer 134 provided above the light transmissive layer 132.

In Modification 2, the lens layer 134 includes the concave lens surface 134s in which a center is recessed at a surface on the inter-substrate conduction electrode 15 side. Note that although not illustrated, in Modification 2, the lens forming layer 35 in the display region A1 also has a similar cross-sectional structure.

In Modification 2, the inter-substrate conduction electrode 15, the relay layer 130, the relay layer 140, and the like are continuously provided as in Modification 1. Note that the inter-substrate conduction electrode 15, the relay layer 130, the relay layer 140, and the like may each be structured to be divided for each pixel as in the example of FIG. 5.

1.9.3. Modification 3

Figure 10:
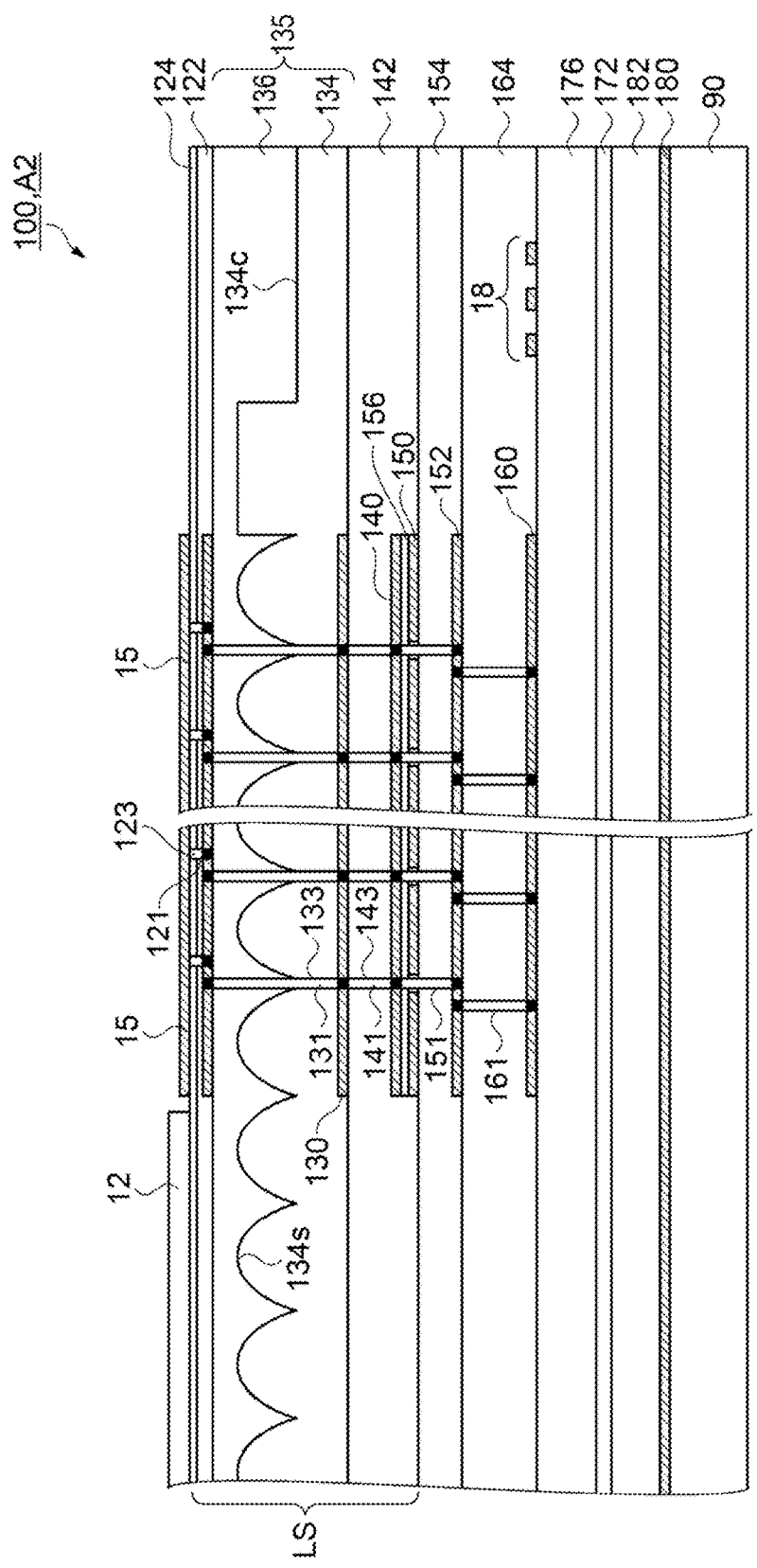
FIG. 10 is an explanatory diagram illustrating a cross-sectional structure taken along a line B-B of FIG. 1 according to Modification 3.

FIG. 10 is an explanatory diagram illustrating a cross-sectional structure according to Modification 3, and illustrates a cross-sectional structure taken along the line B-B in FIG. 1. FIG. 10 particularly illustrates a cross-sectional structure of the alignment mark 18 provided in the peripheral region A2.

The alignment mark 18 is provided at the same layer as the conductive layer 160, and is formed using the same or similar material and the same step to those of the conductive layer 160. In the embodiment, the alignment mark 18 may have a three-layer structure of titanium nitride, aluminum, and titanium nitride.

The lens forming layer 135 overlapping the alignment mark 18 in plan view does not have the lens surface 134s. Therefore, it is possible to improve reliability of reading the alignment mark 18 as compared with the case where the lens surface 134s is provided.

In Modification 3, the lens layer 134 overlapping the alignment mark 18 in plan view has a concave portion 134c.

1.9.4. Modification 4

Figure 11A:
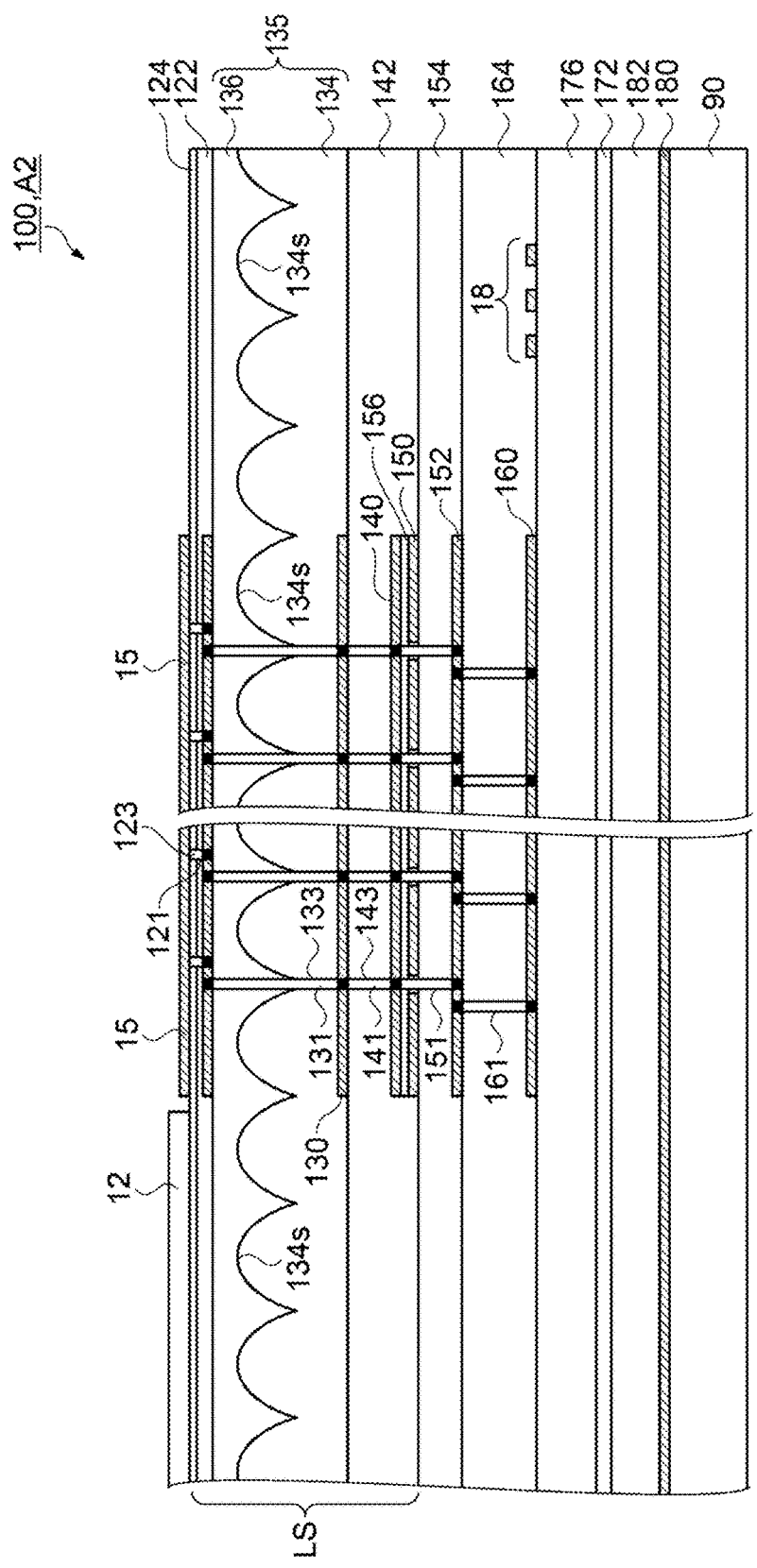
FIG. 11A is an explanatory diagram illustrating a cross-sectional structure of a peripheral region according to Modification 4.

FIG. 11A is an explanatory diagram illustrating a cross-sectional structure according to Modification 4, and as in the case of FIG. 10, illustrates the cross-sectional structure taken along the line B-B in FIG. 1. FIG. 11A illustrates a modification of the cross-sectional structure illustrated in FIG. 10.

Modification 4 is different from Modification 3 in that the lens forming layer 135 overlapping the alignment mark 18 in plan view includes the lens surface 134s.

In the configuration of Modification 4, the reliability of reading the alignment mark 18 is reduced as compared with Modification 3. However, since the lens surface 134s is formed in an entire region of the lens forming layer 135, the lens forming layer 35 and the lens forming layer 135 can have the same or similar structures in the display region A1 and the peripheral region A2. Therefore, it is possible to reduce difficulty in processing the contact hole 33 and the contact hole 133.

1.9.5. Modification 5

Figure 11B:
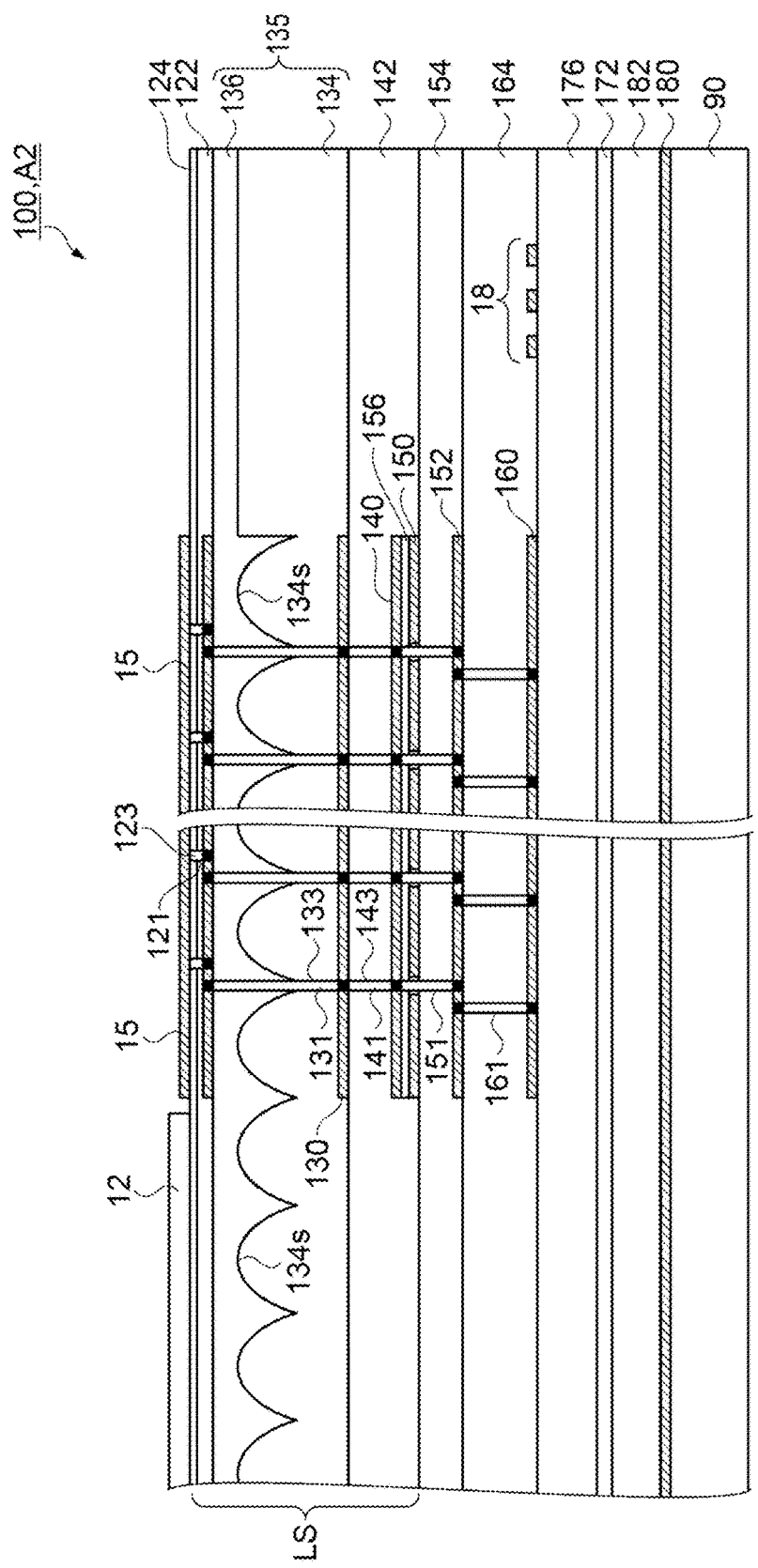
FIG. 11B is an explanatory diagram illustrating a cross-sectional structure of a peripheral region according to Modification 5.

FIG. 11B is an explanatory diagram illustrating a cross-sectional structure according to Modification 5, and as in the case of FIG. 10, illustrates the cross-sectional structure taken along the line B-B in FIG. 1. FIG. 11B illustrates a modification of the cross-sectional structure illustrated in FIG. 10.

Modification 5, as in the case of Modification 3, does not include the lens surface 134s at the lens forming layer 135 overlapping the alignment mark 18 in plan view, but is different from Modification 3 in that the concave portion 134c is not included at the lens forming layer 135 overlapping the alignment mark 18 in plan view.

1.9.6. Modification 6

Figure 11C:
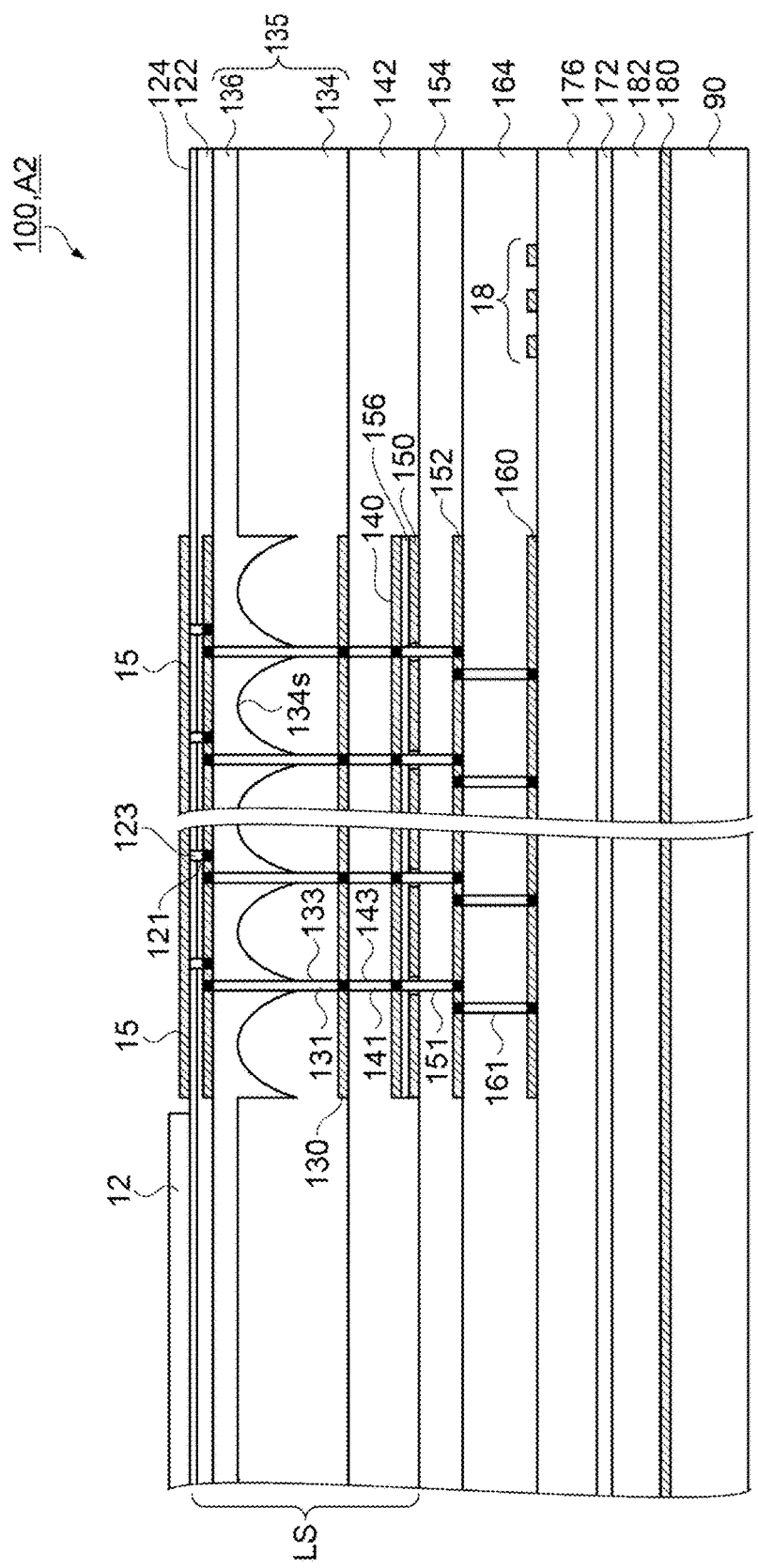
FIG. 11C is an explanatory diagram illustrating a cross-sectional structure of a peripheral region according to Modification 6.

FIG. 11C is an explanatory diagram illustrating a cross-sectional structure according to Modification 6, and as in the case of FIG. 10, illustrates the cross-sectional structure taken along the line B-B in FIG. 1. FIG. 11C illustrates a modification of the cross-sectional structure illustrated in FIG. 10.

In particular, difference in Modification 6 is that, in the lens forming layer 135 in the peripheral region A2, the lens surface 134s is provided only in a region overlapping the inter-substrate conduction electrode 15 in plan view, and that the lens forming layer 135 overlapping the alignment mark 18 in plan view does not include the concave portion 134c.

Although not illustrated, in Modification 6, the lens surface 134s is provided only in a region overlapping other peripheral electrodes such as the inter-substrate conduction electrode 15, the external terminal 9, the inspection terminal 16, and the monitor terminal 17 in plan view.

1.9.7. Modification 7

Figure 11D:
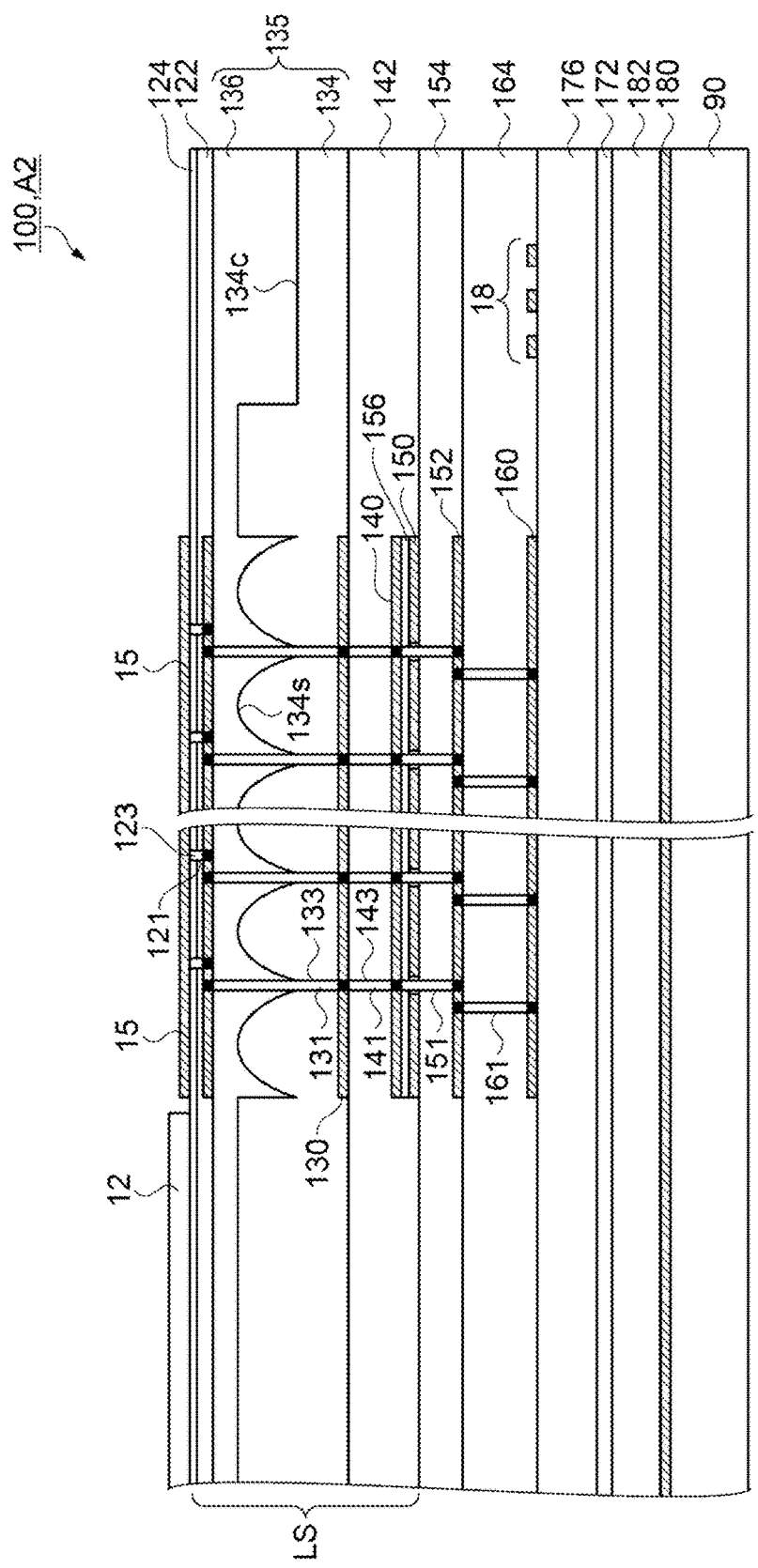
FIG. 11D is an explanatory diagram illustrating a cross-sectional structure of a peripheral region according to Modification 7.

FIG. 11D is an explanatory diagram illustrating a cross-sectional structure according to Modification 7, and as in the case of FIG. 10, illustrates the cross-sectional structure taken along the line B-B in FIG. 1. FIG. 11D illustrates a modification of the cross-sectional structure illustrated in FIG. 10.

Modification 7 is different from Modification 3 particularly in that the lens surface 134s is provided only in a region overlapping the inter-substrate conduction electrode 15 in plan view in the lens forming layer 135 in the peripheral region A2, as in the case of Modification 6 illustrated in FIG. 11C. Note that in Modification 7, the lens layer 134 has the concave portion 134c in a region overlapping the alignment mark 18 in plan view.

As described above, according to the liquid crystal apparatus 300 as the electro-optical apparatus of the embodiment, the following effects can be obtained.

The liquid crystal apparatus 300 of the embodiment includes base 90 as the first substrate, the base 210 facing the base 90 as the second substrate, the liquid crystal layer Lc provided between the base 90 and the base 210 as the electro-optical layer, wherein the base 90 includes the pixel electrode 10 provided in the display region A1, the inter-substrate conduction electrode 15, the external electrode 9, the inspection terminal 16, or the monitor terminal 17 provided in the peripheral region A2 as the peripheral electrode, the transistor 1 provided between the pixel electrode 10 and the base 90, the relay layer 30 provided between the pixel electrode 10 and the transistor 1 as the first relay electrode, the relay layer 130 provided between the inter-substrate conduction electrode 15, the external terminal 9, the inspection terminal 16, or the monitor terminal 17 and the base 90, and being in the same layer as the relay layer 30 as the second relay electrode, the lens forming layer 35 provided between the pixel electrode 10 and the relay layer 30, and including the lens surface 34s as the first lens and the contact hole 33 as the first contact hole as the first lens forming layer, the lens forming layer 135 provided between the inter-substrate conduction electrode 15, the external terminal 9, the inspection terminal 16, or the monitor terminal 17 and the relay layer 130, including the lens surface 134s as the second lens and the contact hole 133 as the second contact hole, and being in the same layer as the lens forming layer 35 as the second lens forming layer, the contact plug 31 provided in the contact hole 33, and electrically coupling the pixel electrode 10 and the relay layer 30 as the first conductive member, and the contact plug 131 provided in the contact hole 133, and electrically coupling the inter-substrate conduction electrode 15, the external electrode 9, the inspection terminal 16, or the monitor terminal 17 and the relay layer 130 as the second conductive member.

As described above, the lens forming layer 35 includes the lens surface 34s between the pixel electrode 10 and the relay layer 30 in the display region A1, and the lens forming layer 135 includes the lens surface 134s between the inter-substrate conduction electrode 15, the external terminal 9, the inspection terminal 16, or the monitor terminal 17 and the relay layer 130 in the peripheral region A2. In other words, in plan view, the lens forming layer 35 overlapping the pixel electrode 10, and the lens forming layer 135 overlapping the inter-substrate conduction electrode 15, the external terminal 9, the inspection terminal 16, or the monitor terminal 17 can have the same or similar structures.

Therefore, it is possible to reduce the difficulty in processing the contact hole 33 and the contact hole 133. In other words, it is easy to secure process window for the contact hole 33 and the contact hole 133.

Therefore, it is possible to achieve both reliability of electrical conduction between the pixel electrode 10 and the relay layer 30, and reliability of electrical conduction between the peripheral electrode such as the inter-substrate conduction electrode 15, the external terminal 9, the inspection terminal 16, or the monitor terminal 17 and the relay layer 130.

Furthermore, a global step between the display region A1 and the peripheral region A2 is reduced. Therefore, since heights of the respective electrodes such as the pixel electrode 10, the inter-substrate conduction electrode 15, the external terminal 9, the inspection terminal 16, and the monitor terminal 17 are aligned, it is easy to control for bringing a probe into contact with an electrode in an inspection process or the like, and it is possible to improve efficiency and reliability of the inspection process.

Furthermore, in the liquid crystal apparatus 300 of the embodiment, the lens surfaces 34s as the first lenses and the lens surfaces 134s as the second lenses are disposed at predetermined pitches, respectively. In other words, the lens surfaces 134s are disposed at the same or similar pitch as that of the lens surfaces 34s.

Therefore, in the display region A1 and the peripheral region A2, the lens forming layer 35 and the lens forming layer 135 can have the same or similar structures, and thus it is possible to reduce the difficulty in processing the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

Furthermore, in the liquid crystal apparatus 300 of the embodiment, the lens surface 34s as the first lens and the lens surface 134s as the second lens each have a predetermined size. In other words, the lens surface 134s has the same or similar size as that of the lens surface 34s.

Therefore, in the display region A1 and the peripheral region A2, the lens forming layer 35 and the lens forming layer 135 can have the same or similar structures, and thus it is possible to reduce the difficulty in processing the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

Furthermore, in the liquid crystal apparatus 300 of the embodiment, the lens surface 34s as the first lens and the lens surface 134s as the second lens have predetermined shapes. In other words, the lens surface 134s has the same or similar size as that of the lens surface 34s.

Therefore, in the display region A1 and the peripheral region A2, the lens forming layer 35 and the lens forming layer 135 can have the same or similar structures, and thus it is possible to reduce the difficulty in processing the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

Furthermore, in the liquid crystal apparatus 300 of the embodiment, the contact plugs 31 as the first conductive members and the contact plugs 131 as the second conductive members are disposed at predetermined pitches, respectively. In other words, the contact plugs 131 are disposed at the same or similar pitch as that of the contact plugs 31.

Therefore, in the display region A1 and the peripheral region A2, the lens forming layer 35 and the lens forming layer 135 can have the same or similar structures, and thus it is possible to reduce the difficulty in processing the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

Furthermore, in the liquid crystal apparatus 300 of the embodiment, each of the contact hole 33 as the first contact hole and the contact hole 133 as the second contact hole has a predetermined aspect ratio. In other words, the contact hole 133 has the same or similar predetermined aspect ratio as that of the contact hole 33.

Therefore, in the display region A1 and the peripheral region A2, the lens forming layer 35 and the lens forming layer 135 can have the same or similar structures, and thus it is possible to reduce the difficulty in processing the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

Furthermore, in the liquid crystal apparatus 300 of the embodiment, the predetermined aspect ratio is from 3 to 13.

Therefore, it is possible to reduce the difficulty in processing the contact hole 33 and the contact hole 133 having the same or similar high aspect ratios.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

Furthermore, in the liquid crystal apparatus 300 of the embodiment, the base 90 as the first substrate includes the alignment mark 18 as the optical reading mark provided between the lens forming layer 135 as the second lens forming layer and the base 90 in the peripheral region A2, and the alignment mark 18 does not overlap the lens surface 134s as the second lens in plan view.

Therefore, the alignment mark 18 can be easily read and the inspection process can be easily performed. It is possible to further reduce the difficulty in processing the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, in the liquid crystal apparatus 300 of the embodiment, the pixel electrode 10 has a predetermined size in plan view, and the peripheral electrode such as the inter-substrate conduction electrode 15, the external terminal 9, the inspection terminal 16, or the monitor terminal 17 has the same or similar predetermined size as that of the pixel electrode 10 in plan view.

Therefore, the display region A1 and the peripheral region A2 can have the same or similar structures, and thus it is possible to reduce the difficulty in processing the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

Furthermore, in the liquid crystal apparatus 300 of the embodiment, the pixel electrode 10 has the first size in plan view, and the inter-substrate conduction electrode 15, the external terminal 9, the inspection terminal 16, or the monitor terminal 17 as the peripheral electrode has the second size greater than the first size in plan view.

Thus, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, in the liquid crystal apparatus 300 of the embodiment, the relay layer 30 as the first relay electrode has the third size in plan view, and the relay layer 130 as the second relay electrode has the fourth size greater than the third size in plan view.

Thus, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, in the liquid crystal apparatus 300 of the embodiment, the contact plug 31 as the first conductive member and the contact plug 131 as the second conductive member are formed of tungsten or a conductive material containing tungsten.

Tungsten is suitable for forming a contact plug having a fine structure with a high aspect ratio as compared with other conductive materials. Therefore, by using tungsten or a conductive material containing tungsten for the contact plug 31 and the contact plug 131, the difficulty of processing the contact plug 31 and the contact plug 131 can be reduced.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, in the liquid crystal apparatus 300 of the embodiment, the peripheral electrode is the inter-substrate conduction electrode 15 that electrically couples the base 90 as the first substrate and the base 210 as the second substrate.

Therefore, it is possible to achieve both the reliability of the electrical conduction between the pixel electrode 10 and the relay layer 30, and reliability of the electrical conduction between the inter-substrate conduction electrode 15 and the relay layer 130.

Furthermore, in the liquid crystal apparatus 300 of the embodiment, the peripheral electrode is the external terminal 9.

Therefore, it is possible to achieve both the reliability of the electrical conduction between the pixel electrode 10 and the relay layer 30, and reliability of the electrical conduction between the external terminal 9 and the relay layer 130.

Furthermore, in the liquid crystal apparatus 300 of the embodiment, the peripheral electrode is the inspection terminal 16.

Therefore, it is possible to achieve both the reliability of the electrical conduction between the pixel electrode 10 and the relay layer 30, and reliability of the electrical conduction between the inspection terminal 16 and the relay layer 130.

Furthermore, in the liquid crystal apparatus 300 of the embodiment, the peripheral electrode is the monitor terminal 17. Therefore, it is possible to achieve both the reliability of the electrical conduction between the pixel electrode 10 and the relay layer 30, and reliability of electrical conduction between the monitor terminal 17 and the relay layer 130.

The liquid crystal apparatus 300 of the embodiment includes the base 90 as the first substrate, the base 210 facing the base 90 as the second substrate, the liquid crystal layer Lc provided between the base 90 and the base 210 as the electro-optical layer, wherein the base 90 includes the pixel electrode 10 provided in the display region A1, the inter-substrate conduction electrode 15, the external electrode 9, the inspection terminal 16, or the monitor terminal 17 provided in the peripheral region A2 as the peripheral electrode, the transistor 1 provided between the pixel electrode 10 and the base 90, the relay layer 30 provided between the pixel electrode 10 and the transistor 1 as the first relay electrode, the relay layer 130 provided between the inter-substrate conduction electrode 15, the external terminal 9, the inspection terminal 16, or the monitor terminal 17 and the base 90, and being in the same layer as the relay layer 30 as the second relay electrode, the relay layer 20 provided between the pixel electrode 10 and the relay layer 30 as the third relay electrode, the relay layer 120 provided between the inter-substrate conduction electrode 15, the external terminal 9, the inspection terminal 16, or the monitor terminal 17 and the relay layer 130, and being in the same layer as the relay layer 20 as the fourth relay electrode, the lens forming layer 35 provided between the relay layer 20 and the relay layer 30, and including the lens surface 34*s* as the first lens and the contact hole 33 as the first contact hole as the first lens forming layer, the lens forming layer 135 provided between the relay layer 120 and the relay layer 130, including the lens surface 134*s* as the second lens and the contact hole 133 as the second contact hole, and being in the same layer as the lens forming layer 35 as the second lens forming layer, the contact plug 31 provided in the contact hole 33, and electrically coupling the pixel electrode 10 and the relay layer 30 as the first conductive member, and the contact plug 131 provided in the contact hole 133, and electrically coupling the inter-substrate conduction electrode 15, the external electrode 9, the inspection terminal 16, or the monitor terminal 17 and the relay layer 130 as the second conductive member.

As described above, the lens forming layer 35 includes the lens surface 34*s* between the relay layer 20 and the relay layer 30 in the display region A1, and the lens forming layer 135 includes the lens surface 134*s* between the relay layer 120 and the relay layer 130 in the peripheral region A2. In other words, in plan view, the lens forming layer 35 overlapping the pixel electrode 10, and the lens forming layer 135 overlapping the inter-substrate conduction electrode 15, the external terminal 9, the inspection terminal 16, or the monitor terminal 17 can have the same or similar structures.

Therefore, it is possible to reduce the difficulty in processing the contact hole 33 and the contact hole 133. In other words, it is easy to secure the process window for the contact hole 33 and the contact hole 133.

Therefore, it is possible to achieve both the reliability of electrical conduction between the pixel electrode 10 and the relay layer 30, and the reliability of electrical conduction between the peripheral electrode such as the inter-substrate conduction electrode 15, the external terminal 9, the inspection terminal 16, or the monitor terminal 17 and the relay layer 130.

Furthermore, the global step between the display region A1 and the peripheral region A2 is reduced.

2. Embodiment 2

A schematic structure of the liquid crystal apparatus 300 as an electro-optical apparatus according to Embodiment 2 will be described with reference to FIGS. 12 and 13.

Figure 12:
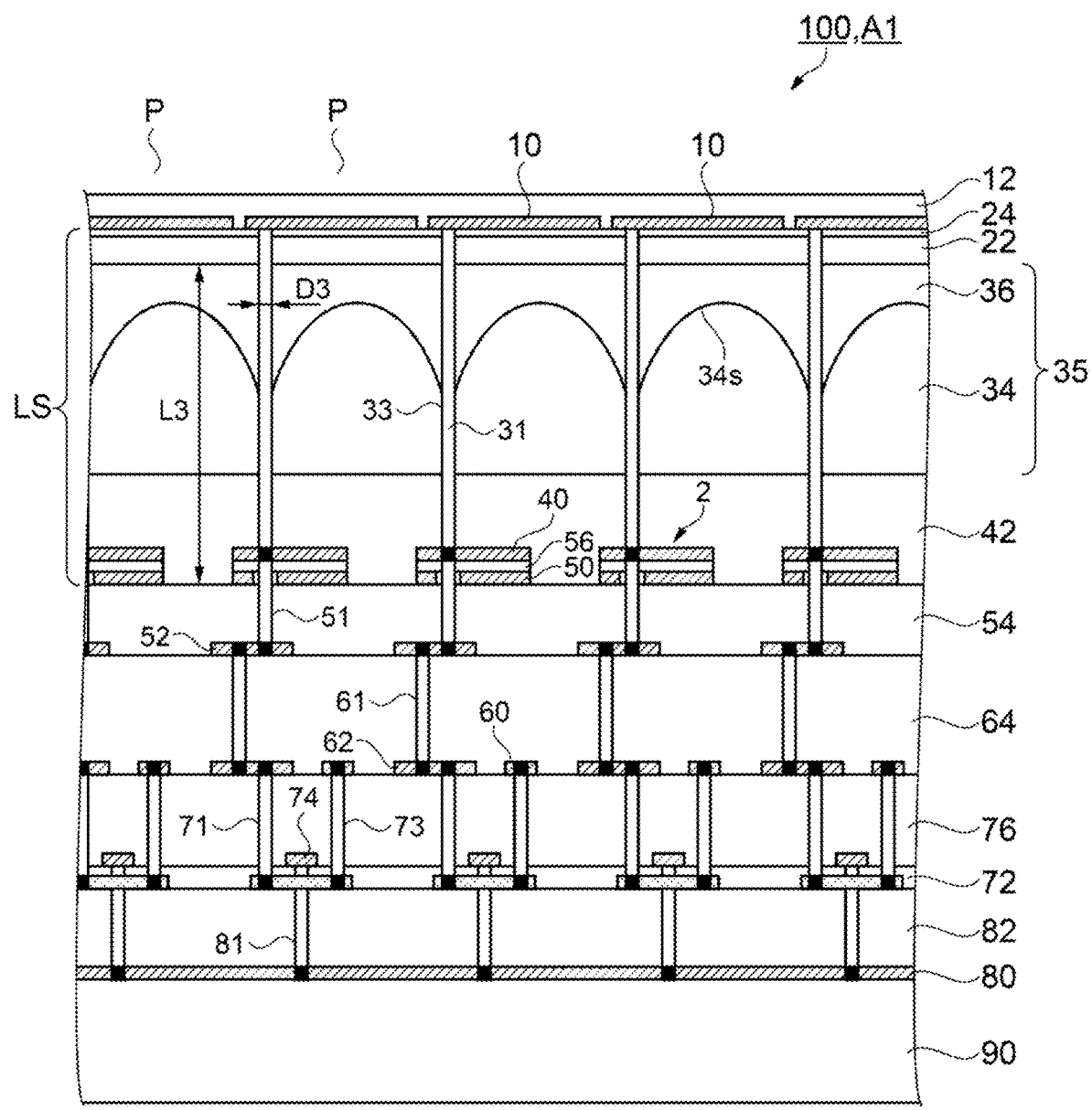
FIG. 12 is an explanatory diagram illustrating a cross-sectional structure of a display region of an element substrate according to Embodiment 2.

FIG. 12 is an explanatory diagram illustrating a cross-sectional structure of the display region A1 of the element substrate 100 in the liquid crystal apparatus 300 according to Embodiment 2. FIG. 13 is an explanatory diagram illustrating a cross-sectional structure of the peripheral region A2 of the element substrate 100 in the liquid crystal apparatus 300 according to Embodiment 2.

Embodiment 2 is different from Embodiment 1 in that the optical functional layer LS does not include the relay layer 20, the relay layer 120, the relay layer 30, and the relay layer 130. Note that the same reference numerals are given to the same or similar configurations as in Embodiment 1, and the description thereof will be omitted.

2.1. Cross-sectional Structure of Display Region of Element Substrate

As illustrated in FIG. 12, in Embodiment 2, the optical functional layer LS does not include the relay layer 20 and the relay layer 30. Thus, the contact hole 33 extends through the protective layer 24, the light transmissive layer 22, the light transmissive layer 36, the lens layer 34, and the light transmissive layer 42, and exposes the capacitive electrode 40 at the bottom of the contact hole 33.

In Embodiment 2, the capacitive electrode 40 is an example of the first relay electrode. Further, the contact hole 33 is an example of the first contact hole. Further, the lens forming layer 35 is an example of the first lens forming layer.

In Embodiment 2, a depth L3 of the contact hole 33 is from about 3.3 to 21 μm, and suitably 1.25 μm. Further, an inside diameter D3 of the contact hole 33 is about 1 μm. Therefore, an aspect ratio of the contact hole 33=depth L3/inside diameter D3 is about from 3.3 to 21, and suitably 12.5.

2.2. Cross-sectional Structure of Peripheral Region of Element Substrate

Figure 13:
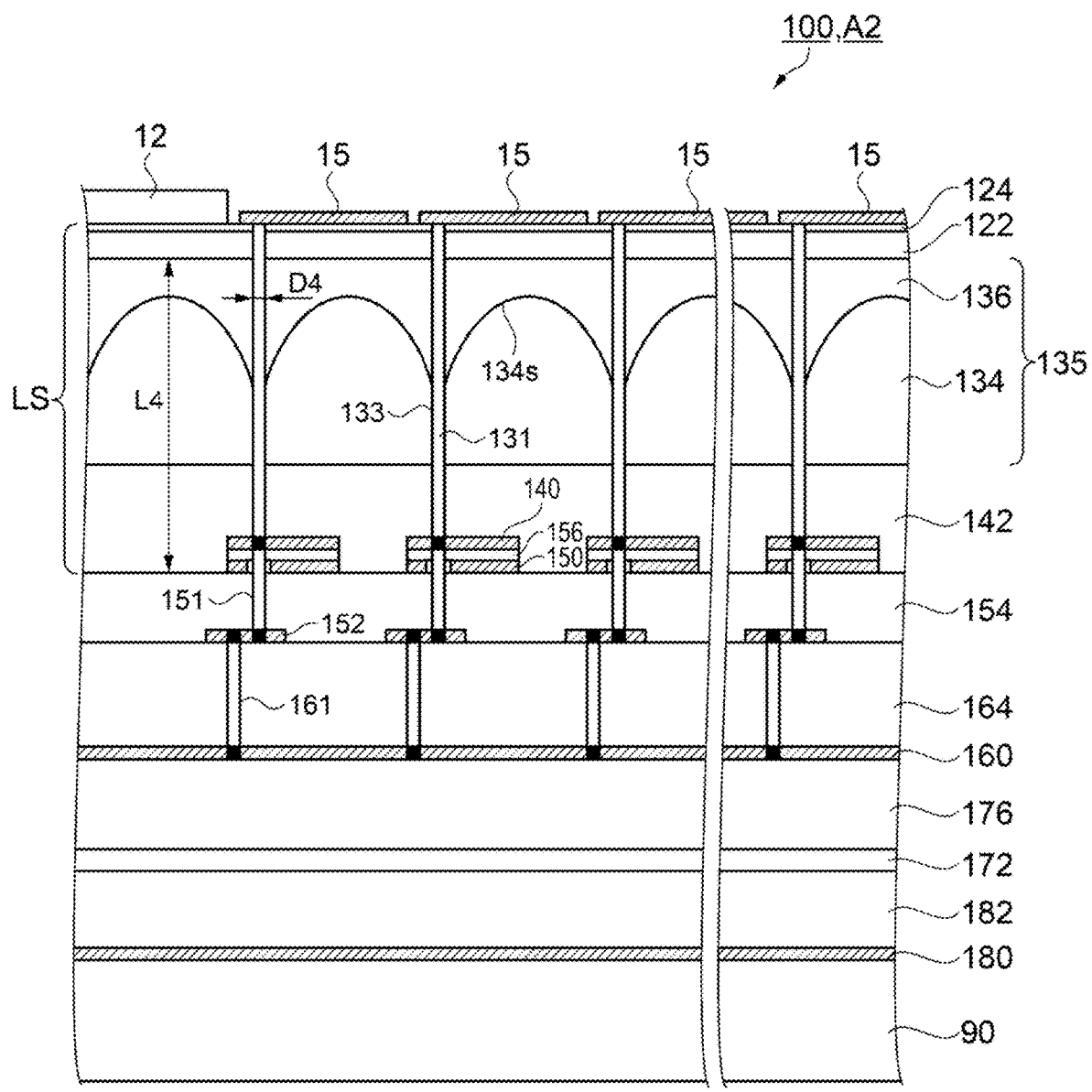
FIG. 13 is an explanatory diagram illustrating a cross-sectional structure of a peripheral region of the element substrate according to Embodiment 2.

As illustrated in FIG. 13, in Embodiment 2, the optical functional layer LS does not include the relay layer 120 and the relay layer 130. Thus, the contact hole 133 extends through the protective layer 124, the light transmissive layer 122, the light transmissive layer 136, the lens layer 134, and the light transmissive layer 142, and exposes the relay layer 140 at a bottom of the contact hole 133.

In Embodiment 2, the relay layer 140 is an example of the second relay electrode. The contact hole 133 is an example of the second contact hole. The lens forming layer 135 is an example of the second lens forming layer.

In Embodiment 2, as in the case of the depth L3 of the contact hole 33, a depth L4 of the contact hole 133 is about from 3.3 to 21 µm, and suitably 12.5 µm. Also, an inside diameter D4 of the contact hole 133 is about 1 µm, as in the case of the inside diameter D4 of the contact hole 33.

Therefore, as in the case of the aspect ratio of the contact hole 33, an aspect ratio=depth L4/inside diameter D4 of the contact hole 133 is about from 3.3 to 21, and suitably 12.5.

Although the cross-sectional structure of the inter-substrate conduction electrode 15 is illustrated in FIG. 13, cross-sectional structures of the other peripheral electrodes such as the external terminal 9, the inspection terminal 16, and the monitor terminal 17 are similarly configured.

2.3. Modifications

In Embodiment 2, the aspect of the cross-sectional structure of the peripheral region A2 of the element substrate 100 may be modified in various ways. Specific aspects of the modification will be exemplified below.

2.3.1. Modification 8

Figure 14:
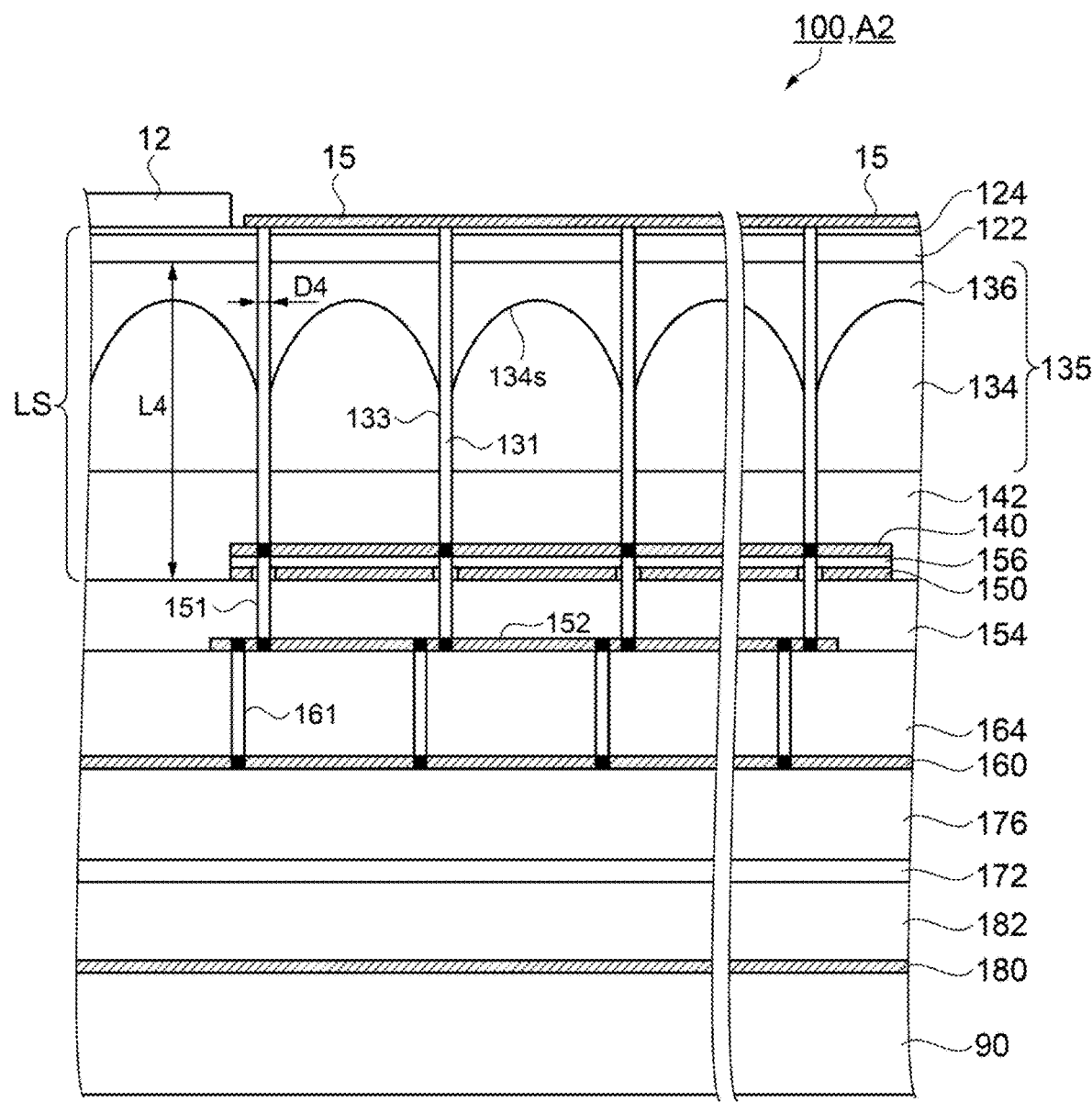
FIG. 14 is an explanatory diagram illustrating a cross-sectional structure of a peripheral region according to Modification 8.

FIG. 14 is an explanatory diagram illustrating a cross-sectional structure according to Modification 8, and illustrates a modification of the cross-sectional structure of the peripheral region A2 of the element substrate 100 illustrated in FIG. 13.

In Modification 8, the inter-substrate conduction electrode 15 is continuously provided. Specifically, a plurality of the inter-substrate conduction electrodes 15 illustrated in FIG. 13 are coupled to form the one inter-substrate conduction electrode 15. In other words, in Modification 8, when the size of the pixel electrode 10 in plan view is defined as the first size, the inter-substrate conduction electrode 15 has the second size greater than the first size.

Similarly, the relay layer 140, the conductive layer 150, the relay layer 152, the conductive layer 160, and the insulating film 156 are also continuously provided.

In Modification 8, when the size of the capacitive electrode 40 in plan view is defined as the third size, the relay layer 140 has the fourth size greater than the third size. In Modification 8, the fourth size is substantially the same as the second size described above.

In Modification 8, cross-sectional structures of other peripheral electrodes such as the external terminal 9, the inspection terminal 16, and the monitor terminal 17 are similarly configured.

2.3.2. Modification 9

In Embodiments 1 and 2 described above, the peripheral electrode such as the inter-substrate conduction electrode 15, the external terminal 9, the inspection terminal 16, or the monitor terminal 17 and the pixel electrode 10 are each provided above the optical functional layer LS.

In Modification 9, the configuration of the optical functional layer LS is made partially different between the display region A1 and the peripheral region A2.

To be specific, the peripheral region A2 has a configuration in which the light transmissive layer 122 is not provided between the peripheral electrode such as the inter-substrate conduction electrode 15, the external terminal 9, the inspection terminal 16, or the monitor terminal 17 and the light transmissive layer 136. This configuration can be achieved by, for example, forming the light transmissive layer 22 and the light transmissive layer 122 as films, and then removing only the light transmissive layer 122 in the peripheral region A2.

Layer thicknesses of the light transmissive layer 122 and the light transmissive layer 22 are smaller than those of the lens forming layer 35 and the lens forming layer 135. Thus, even with such a configuration, similar effects to those of the above-described embodiment can be obtained.

As described above, according to the liquid crystal apparatus 300 as the electro-optical apparatus of Embodiment 2, the following effects can be obtained in addition to the effects of Embodiment 1.

The liquid crystal apparatus 300 of Embodiment 2 includes the base 90 as the first substrate, the base 210 facing the base 90 as the second substrate, the liquid crystal layer Lc provided between the base 90 and the base 210 as the electro-optical layer, wherein the base 90 includes the pixel electrode 10 provided in the display region A1, the inter-substrate conduction electrode 15, the external electrode 9, the inspection terminal 16, or the monitor terminal 17 provided in the peripheral region A2 as the peripheral electrode, the transistor 1 provided between the pixel electrode 10 and the base 90, the capacitive electrode 40 provided between the pixel electrode 10 and the transistor 1 as the first relay electrode, the relay layer 140 provided between the inter-substrate conduction electrode 15, the external terminal 9, the inspection terminal 16, or the monitor terminal 17 and the base 90, and being in the same layer as the capacitive electrode 40 as the second relay electrode, the lens forming layer 35 provided between the pixel electrode 10 and the capacitive electrode 40, and including the lens surface 34s as the first lens and the contact hole 33 as the first contact hole as the first lens forming layer, the lens forming layer 135 provided between the inter-substrate conduction electrode 15, the external terminal 9, the inspection terminal 16, or the monitor terminal 17 and the relay layer 140, including the lens surface 134s as the second lens and the contact hole 133 as the second contact hole, and being in the same layer as the lens forming layer 35 as the second lens forming layer, the contact plug 31 provided in the contact hole 33, and electrically coupling the pixel electrode 10 and the capacitive electrode 40 as the first conductive member, and the contact plug 131 provided in the contact hole 133, and electrically coupling the inter-substrate conduction electrode 15, the external electrode 9, the inspection terminal 16, or the monitor terminal 17 and the relay layer 140 as the second conductive member.

As described above, the lens forming layer 35 includes the lens surface 34s between the pixel electrode 10 and the capacitive electrode 40 in the display region A1, and the lens forming layer 135 includes the lens surface 134s between the inter-substrate conduction electrode 15, the external terminal 9, the inspection terminal 16, or the monitor terminal 17 and the relay layer 140 in the peripheral region A2. In other words, in plan view, the lens forming layer 35 overlapping the pixel electrode 10, and the lens forming layer 135 overlapping the inter-substrate conduction electrode 15, the external terminal 9, the inspection terminal 16, or the monitor terminal 17 can have the same or similar structures.

Therefore, it is possible to reduce the difficulty in processing the contact hole 33 and the contact hole 133. In other words, it is easy to secure the process window for the contact hole 33 and the contact hole 133.

Therefore, it is possible to achieve both reliability of electrical conduction between the pixel electrode 10 and the capacitive electrode 40, and reliability of electrical conduction between the peripheral electrode such as the inter-substrate conduction electrode 15, the external terminal 9, the inspection terminal 16, or the monitor terminal 17 and the relay layer 140.

Furthermore, the global step between the display region A1 and the peripheral region A2 is reduced.

3. Embodiment 3

Figure 15:
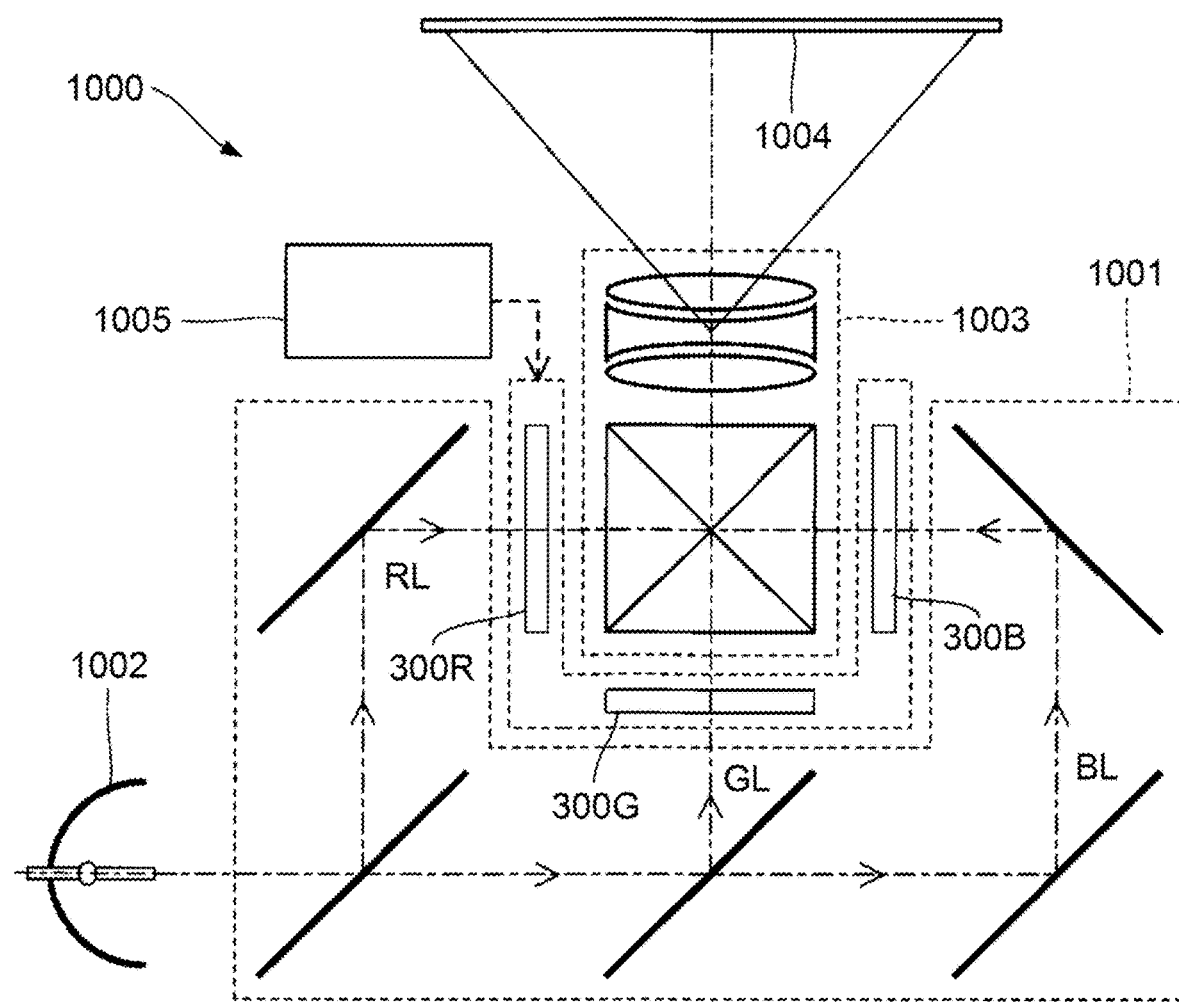
FIG. 15 is a schematic view illustrating an example of an electronic apparatus according to Embodiment 3.

FIG. 15 is a schematic view illustrating an example of an electronic apparatus, and is a schematic view illustrating a schematic configuration of a projection-type display device 1000 as the electronic apparatus.

The projection-type display device 1000 is a three-plate type projector including the three liquid crystal apparatuses 300 described above, for example. A liquid crystal apparatus 300R corresponds to a display color of red, a liquid crystal apparatus 300G corresponds to a display color of green, and a liquid crystal apparatus 300B corresponds to a display color of blue. A control unit 1005 includes a processor and a memory, and controls operation of the liquid crystal apparatuses 300R, 300G, and 300B, for example.

In light emitted from an illumination apparatus 1002 serving as a light source, an illumination optical system 1001 supplies a red component RL to the liquid crystal apparatus 300R, a green component GL to the liquid crystal apparatus 300G, and a blue component BL to the liquid crystal apparatus 300B. The liquid crystal apparatuses 300R, 300G and 300B function as light modulation apparatuses that modulate the color light RL, GL and BL supplied from the illumination optical system 1001 in accordance with the display image.

A projection optical system 1003 combines light emitted from the liquid crystal apparatus 300R, light emitted from the liquid crystal apparatus 300G, and light emitted from the liquid crystal apparatus 300B, and projects the combined light to a screen 1004.

As described above, the projection-type display apparatus 1000 as the electronic apparatus of the embodiment includes the above-described liquid crystal apparatus 300.

In this manner, performance of the projection-type display apparatus 1000 can be improved by employing the liquid crystal apparatus 300 with high electrical reliability.

Note that the electronic apparatus is not limited to the projector of three-plate type exemplified above. For example, a projector of single-plate type, two-plate type, or of a type with four or more liquid crystal apparatuses 300 may be used. In addition, the electronic apparatus may be a smart phone, personal digital assistants (PDA), a camera, a television, a car navigation device, a personal computer, a display, an electronic paper, a calculator, a television phone, and an apparatus including a point of sale (POS), a printer, a scanner, a copier, a video player, or a touch panel, and the like.

Although preferred embodiments have been described above, the present disclosure is not limited to the above-described embodiments. In addition, the configuration of each component of the present disclosure can be replaced with any configuration with the same functions of the above embodiments, and any configuration can be added.

What is claimed is:

1. An electro-optical apparatus, comprising:
   a first substrate;
   a second substrate facing the first substrate; and
   an electro-optical layer provided between the first substrate and the second substrate, wherein
   the first substrate includes
   a pixel electrode provided in a display region,
   a peripheral electrode provided in a peripheral region,
   a transistor provided between the pixel electrode and the first substrate,
   a first relay electrode provided between the pixel electrode and the transistor,
   a second relay electrode provided between the peripheral electrode and the first substrate, and being in the same layer as the first relay electrode,
   a first lens forming layer provided between the pixel electrode and the first relay electrode, and including a first lens and a first contact hole,
   a second lens forming layer provided between the peripheral electrode and the second relay electrode, including a second lens and a second contact hole, and being in the same layer as the first lens forming layer,
   a first conductive member provided in the first contact hole, and electrically coupling the pixel electrode and the first relay electrode, and
   a second conductive member provided in the second contact hole, and electrically coupling the peripheral electrode and the second relay electrode.

2. The electro-optical apparatus according to claim 1, wherein
   the first lens is disposed at a predetermined pitch, and
   the second lens is disposed at the predetermined pitch.

3. The electro-optical apparatus according to claim 1, wherein
   the first lens has a predetermined size, and
   the second lens has the predetermined size.

4. The electro-optical apparatus according to claim 1, wherein
   the first lens has a predetermined shape, and
   the second lens has the predetermined shape.

5. The electro-optical apparatus according to claim 1, wherein
   the first conductive member is disposed at a predetermined pitch, and
   the second conductive member is disposed at the predetermined pitch.

6. The electro-optical apparatus according to claim 1, wherein
   the first contact hole has a predetermined aspect ratio, and
   the second contact hole has the predetermined aspect ratio.

7. The electro-optical apparatus according to claim 6, wherein
   the predetermined aspect ratio is from 3 to 13.

8. The electro-optical apparatus according to claim 1, wherein
   the first substrate includes an optical reading mark provided between the second lens forming layer and the first substrate in the peripheral region, and
   the optical reading mark does not overlap the second lens in plan view.

9. The electro-optical apparatus according to claim 1, wherein
   the pixel electrode has a predetermined size in plan view, and
   the peripheral electrode has the predetermined size in plan view.

10. The electro-optical apparatus according to claim 1, wherein
   the pixel electrode has a first size in plan view, and
   the peripheral electrode has a second size greater than the first size in plan view.

11. The electro-optical apparatus according to claim 1, wherein
the first relay electrode has a third size in plan view, and
the second relay electrode has a fourth size greater than the third size in plan view.

12. The electro-optical apparatus according to claim 1, wherein
the first conductive member and the second conductive member are formed of tungsten or a conductive material containing tungsten.

13. The electro-optical apparatus according to claim 1, wherein
the peripheral electrode is an inter-substrate conduction electrode that electrically couples the first substrate and the second substrate.

14. The electro-optical apparatus according to claim 1, wherein
the peripheral electrode is an external terminal.

15. The electro-optical apparatus according to claim 1, wherein
the peripheral electrode is an inspection terminal.

16. The electro-optical apparatus according to claim 1, wherein
the peripheral electrode is a monitor terminal.

17. An electronic apparatus comprising the electro-optical apparatus according to claim 1.

18. An electro-optical apparatus, comprising:
a first substrate;
a second substrate facing the first substrate; and
an electro-optical layer provided between the first substrate and the second substrate, wherein
the first substrate includes
a pixel electrode provided in a display region,
a peripheral electrode provided in a peripheral region,
a transistor provided between the pixel electrode and the first substrate,
a first relay electrode provided between the pixel electrode and the transistor,
a second relay electrode provided between the peripheral electrode and the first substrate, and being in the same layer as the first relay electrode,
a third relay electrode provided between the pixel electrode and the first relay electrode,
a fourth relay electrode provided between the peripheral electrode and the second relay electrode, and being in the same layer as the third relay electrode,
a first lens forming layer provided between the third relay electrode and the first relay electrode, and including a first lens and a first contact hole,
a second lens forming layer provided between the fourth relay electrode and the second relay electrode, including a second lens and a second contact hole, and being in the same layer as the first lens forming layer,
a first conductive member provided in the first contact hole, and electrically coupling the pixel electrode and the first relay electrode, and
a second conductive member provided in the second contact hole, and electrically coupling the peripheral electrode and the second relay electrode.

* * * * *